United States Patent
Cavaliere et al.

(10) Patent No.: US 10,291,331 B2
(45) Date of Patent: May 14, 2019

(54) DIGITAL SIGNAL PROCESSING OF AN OPTICAL COMMUNICATIONS SIGNAL IN A COHERENT OPTICAL RECEIVER

(71) Applicant: Telefonaktiebolaget LM Ericsson (publ), Stockholm (SE)

(72) Inventors: Fabio Cavaliere, Pisa (IT); Marco Secondini, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 84 days.

(21) Appl. No.: 15/525,670

(22) PCT Filed: Feb. 9, 2015

(86) PCT No.: PCT/EP2015/052574
§ 371 (c)(1),
(2) Date: May 10, 2017

(87) PCT Pub. No.: WO2016/074803
PCT Pub. Date: May 19, 2016

(65) Prior Publication Data
US 2017/0338893 A1    Nov. 23, 2017

Related U.S. Application Data

(60) Provisional application No. 62/079,240, filed on Nov. 13, 2014.

(51) Int. Cl.
*H04B 10/61*    (2013.01)
*H04B 10/64*    (2013.01)
(Continued)

(52) U.S. Cl.
CPC .......... *H04B 10/616* (2013.01); *G02F 2/002* (2013.01); *H04B 10/6165* (2013.01);
(Continued)

(58) Field of Classification Search
CPC .............. H04B 10/616; H04B 10/6162; H04B 10/6165; H04B 10/64; H04B 10/691;
(Continued)

(56) References Cited

U.S. PATENT DOCUMENTS 7,684,712 B1 * 3/2010 Roberts .................. H04B 10/60
375/341
9,240,843 B1 * 1/2016 Malouin .............. H04B 10/616
(Continued)

FOREIGN PATENT DOCUMENTS

WO    2010104783 A1    9/2010

OTHER PUBLICATIONS

Secondini, M. et al., "Optical Time-Frequency Packing: Principles, Design, Implementation, and Experimental Demonstration", Physics Optics, Jun. 9, 2015, pp. 1-13, arXiv:1411.6892v2, IEEE.
(Continued)

*Primary Examiner* — Young T Tse
(74) *Attorney, Agent, or Firm* — Patent Portfolio Builders, PLLC

(57) ABSTRACT

A digital signal processing, DSP, unit (10) for use in a coherent optical receiver for an optical communications network. The DSP unit comprises an adaptive equalizer (12) and a processing block (22). The equalizer (12) comprises input ports for receiving electrical signals, each corresponding to a different state of polarization of an optical signal received by the coherent optical receiver, and output ports, each connected to a processing branch (14). A processing branch comprises a symbol sequence estimator, SSE, (16) and a carrier phase estimator, CPE, (18) comprising an input for receiving signal taped from an output of the processing branch. An output of the CPE is connected to a phase adjuster (20) interconnecting the respective output port of the equalizer and the SSE. The processing block (22) is
(Continued)

connected to an output of the CPE, an output of the processing branch and at least one of the output of the phase adjuster and the outputs of the equalizer.

20 Claims, 11 Drawing Sheets

(51) Int. Cl.
    *G02F 2/00*     (2006.01)
    *H04L 25/03*     (2006.01)
    *H04J 14/02*     (2006.01)
    *H04Q 11/00*     (2006.01)

(52) U.S. Cl.
    CPC .............. *H04B 10/64* (2013.01); *H04J 14/02* (2013.01); *H04L 25/03178* (2013.01); *H04L 2025/03675* (2013.01); *H04Q 2011/0011* (2013.01)

(58) Field of Classification Search
    CPC ................. H04B 10/6971; H04J 14/02; H04L 25/03171; H04L 25/03178; H04L 2025/03675; H04L 2025/03885; H04Q 2011/0011; H02F 2/002
    USPC ....... 375/232, 233, 235, 324, 325, 340, 341, 375/346, 348, 349; 398/119, 130, 138, 398/158, 159, 202, 205, 208; 714/794, 714/795
    See application file for complete search history.

(56) References Cited

U.S. PATENT DOCUMENTS

| | | | | |
|---|---|---|---|---|
| 2005/0196176 A1* | 9/2005 | Sun | .................... | H04B 10/2572 398/152 |
| 2009/0201796 A1* | 8/2009 | Roberts | .................. | H04B 10/60 370/210 |
| 2011/0217043 A1* | 9/2011 | Pfau | ........................ | H04J 14/06 398/65 |
| 2012/0106983 A1 | 5/2012 | Xu et al. | | |
| 2013/0259490 A1* | 10/2013 | Malouin | ............ | H04B 10/6166 398/152 |
| 2013/0308960 A1 | 11/2013 | Horikoshi et al. | | |
| 2014/0086594 A1* | 3/2014 | Xie | .................... | H04B 10/6161 398/208 |
| 2014/0099128 A1* | 4/2014 | Mateo | ................ | H04B 10/6163 398/158 |
| 2014/0286651 A1 | 9/2014 | Takechi | | |
| 2015/0030331 A1* | 1/2015 | Salsi | .................... | H04B 10/614 398/65 |

OTHER PUBLICATIONS

Ungerboeck, G., "Adaptive Maximum-Likelihood Receiver for Carrier-Modulated Data-Transmission Systems", IEEE Transactions on Communications, May 1974, pp. 624-636, vol. Com-22, No. 5.

Faruk, S., "Modified CMA Based Blind Equalization and Carrier-Phase Recovery in PDM-QPSK Coherent Optical Receivers", 16th International Conf. Computer and Information Technology, Mar. 8-10, 2014, pp. 1-4, Khulna, Bangladesh.

Djordjevic, I. et al., "Suppression of Fiber Nonlinearities and PMD in Coded-Modulation Schemes With Coherent Detection by Using Turbo Equalization", J. Opt. Commun. Netw., Nov. 6, 2009, pp. 555-564, vol. 1, No. 6.

Renaudier, J., et al., "8Tb/s Long Haul Transmission Over Low Dispersion Fibers Using 100 Gb/s PDM-QPSK Channels Paired with Coherent Detection", Bell Labs Technical Journal, Jan. 4, 2010, pp. 27-45, vol. 14, No. 4.

Kuschnerov M. et al., "DSP for Coherent Single-Carrier Receivers", J. Lightwave Technol., vol. 27, No. 16, Aug. 15, 2009, pp. 3614-3622.

Mengali U. et al., "Data-Aided Frequency Estimation for Burst Digital transmission", IEEE Transactions on Communications, vol. 45, No. 1, p. 23-25, Jan. 1997.

\* cited by examiner

DIGITAL SIGNAL PROCESSING OF AN OPTICAL COMMUNICATIONS SIGNAL IN A COHERENT OPTICAL RECEIVER

TECHNICAL FIELD

The invention relates to a digital signal processing unit for use in a coherent optical receiver for an optical communications network and to a coherent optical receiver for an optical communications network comprising a said digital signal processing unit. The invention further relates to a method for digital signal processing of an optical communications signal in a coherent optical receiver.

BACKGROUND

The received signal in coherent fiber-optic systems is affected by propagation impairments, e.g., polarization rotations, chromatic dispersion, polarization mode dispersion. The phase and frequency offset compensation issues in coherent fiber-optic systems are discussed, for example, by M. Kuschnerov et al in "DSP for Coherent Single-Carrier Receivers", J. Lightwave Technol., vol. 27, no. 16, page 3614, 15 Aug. 2009. In conventional wavelength division multiplexing, WDM, optical communications systems, employing orthogonal signaling, such as Nyquist WDM, fiber impairments are compensated for by an adaptive 2D feed-forward equalizer, 2D-FFE, also known as butterfly equalizer. The equalizer is simply configured and adaptively controlled by means of a stochastic gradient algorithm that tries to minimize the mean square error, MSE, between equalized samples and transmitted symbols. In this way, the 2D-FFE minimizes the contribution of noise and intersymbol interference, ISI, to the MSE. However, in coherent systems based on time-frequency packing, TFP, this strategy is no longer optimal. In fact, the role of the 2D-FFE should be that of compensating for fiber impairments and performing matched filtering, without trying to remove the ISI intentionally introduced by TFP. After the 2D-FFE, a maximum a posteriori probability, MAP, detector (implemented, for instance, by a Bahl, Cocke, Jelinek, Raviv, BCJR, algorithm) should take care of this ISI. Moreover, the control strategy should be adaptive and should not require prior knowledge of the transfer function of the various elements composing the transmitter (drivers, modulators, filters) and receiver (filters, photodetectors, analog-to-digital converters). Finally, the control strategy should also take care of possible interactions with the frequency-offset and phase-noise compensation algorithms.

SUMMARY

It is an object to provide an improved digital signal processing unit for use in a coherent optical receiver for an optical communications network. It is a further object to provide an improved coherent optical receiver for an optical communications network comprising. It is a further object to provide an improved method for digital signal processing of an optical communications signal in a coherent optical receiver.

A first aspect of the invention provides a digital signal processing unit for use in a coherent optical receiver for an optical communications network. The digital signal processing unit comprises an adaptive equalizer and a processing block. The adaptive equalizer comprises a number of input ports for receiving electrical signals and a number of output ports. Each electrical signal corresponds to a different state of polarization of an optical signal received by the coherent optical receiver. Each of the output ports is connected to a processing branch, wherein a processing branch comprises at least one symbol sequence estimator and a carrier phase estimator. The carrier phase estimator comprises an input for receiving signal taped from an output of the processing branch. An output of the carrier phase estimator is connected to a phase adjuster interconnecting the respective output port of the adaptive equalizer and the symbol sequence estimator. The processing block is connected to an output of the carrier phase estimator, an output of the processing branch and at least one of the output of the phase adjuster and the outputs of the adaptive equalizer.

The digital signal processing, DSP, unit may distinguish between the ISI due to fiber propagation impairments (which is compensated for by the adaptive equalizer) and the ISI intentionally introduced by TFP (which is accounted for by the symbol sequence estimator). In this way, the DSP unit may ensure a proper distribution of tasks between the adaptive equalizer and the symbol sequence estimator. The DSP unit may enable signals having high ISI, as in the case of TFP, to be correctly received.

In an embodiment, the processing block is arranged to perform simultaneous channel response coefficients estimation and equalizer coefficients estimation. The processing block is arranged to provide resulting channel response coefficients to the symbol sequence estimator and to provide resulting equalizer coefficients to the adaptive equalizer. The DSP unit may distinguish between the ISI due to fiber propagation impairments and the ISI intentionally introduced by TFP, and may ensure a proper distribution of tasks between the adaptive equalizer and the symbol sequence estimator.

In an embodiment, the processing block is arranged to perform a gradient algorithm consisting of a first relationship for estimating the equalizer coefficients and a second relationship for estimating the channel response coefficients. The symbol sequence estimator is arranged to perform a symbol sequence estimation algorithm using the channel response coefficients. The DSP unit is based on a stochastic gradient algorithm, as in conventional coherent optical systems, but may distinguish between the ISI due to fiber propagation impairments and the ISI intentionally introduced by TFP. The DSP unit may therefore ensure a proper distribution of tasks between the adaptive equalizer and the symbol sequence estimator.

In an embodiment, the gradient algorithm is an iterative data-aided stochastic-gradient algorithm arranged to minimise an error, $e_k$, between a selected equalized signal sample output from the adaptive equalizer and an estimated channel sample. The DSP unit is based on a stochastic gradient algorithm, as in conventional coherent optical systems, but may distinguish between the ISI due to fiber propagation impairments and the ISI intentionally introduced by TFP. The DSP unit may therefore ensure a proper distribution of tasks between the adaptive equalizer and the symbol sequence estimator.

In an embodiment, the first relationship is arranged to estimate an equalizer coefficient, $C^{(k+1)}$, by subtracting a first update value from a preceding equalizer coefficient, $C^{(k)}$, the first update value being proportional to the error, $e_k$, and a second relationship for estimating a channel response coefficient, $h^{(k+1)}$, by adding a second update value to a preceding channel response coefficient, $h^{(k)}$, the second update value being proportional to the error, $e_k$. By using this variation of the stochastic-gradient algorithm the DSP unit may perform simultaneous channel response coefficients and equalizer coefficients estimation. This may enable the DSP unit to distinguish between the ISI due to fiber propagation impairments and the ISI intentionally introduced by TFP, and therefore ensure a proper distribution of tasks between the adaptive equalizer and the symbol sequence estimator.

In an embodiment, the first relationship is:

$$c_i^{(k+1)} = c_i^{(k)} - \alpha_c(g_k \circ e_k)s_{k-i}^\dagger, 0 \leq i \leq N_c - 1,$$

where $\alpha_c$ is a first step-size gain, $g_k$ is a column vector of phase estimates for a k-th equalized signal sample, $s_k$, and $N_c$ is a number of taps of the adaptive equalizer. The second relationship is:

$$h_i^{(k+1)} = h_i^{(k)} + \alpha_h(e_k \circ x_{k-i}^* + e_k^* \circ x_{k+i}), 1 \leq i \leq L_T,$$

where $\alpha_h$ is a second step-size gain, $x_{k+i}$ is a column vector of transmitted symbols and $L_T$ is a number of signal samples used by the symbol sequence estimator.

By using this variation of the stochastic-gradient algorithm the DSP unit may perform simultaneous channel response coefficients and equalizer coefficients estimation. This may enable the DSP unit to distinguish between the ISI due to fiber propagation impairments and the ISI intentionally introduced by TFP, and therefore ensure a proper distribution of tasks between the adaptive equalizer and the symbol sequence estimator. The relationships of this stochastic-gradient algorithm require knowledge of the transmitted symbols. While the equalizer coefficients need to be continuously updated to track variations of the fiber-optic channel, coefficients $\{h_i\}$ of the overall channel response do not change with time and can be estimated only once when setting up a link. The initial convergence of the algorithm can be guaranteed by the use of a known training sequence, while a slow tracking of the fiber channel can be achieved by updating only the equalizer coefficients according to the first relationship. This may be done at a much lower rate than the sampling rate, 1/T, and with a significant delay. This may allow the DSP unit to be used with pilot symbols and/or to replace transmitted symbols with final decisions (after successful decoding of the whole codeword), with a negligible impact on information rate and performance.

In an embodiment, the optical signal received by the coherent optical receiver carries a sequence of transmitted symbols and pilot symbols evenly inserted in the sequence at a rate $r_p$. The carrier phase estimator is configured to exploit the pilot symbols to provide a rough initial estimate of the carrier phase. This may enable the iterative data-aided stochastic-gradient algorithm to bootstrap, since at the first iteration, preliminary symbol decisions are not available.

In an embodiment, each of the output ports of the adaptive equalizer is connected to a separate processing branch. Each separate processing branch comprises at least one said symbol sequence estimator, a said carrier phase estimator and a phase adjuster interconnecting the respective output port of the adaptive equalizer and the at least one symbol sequence estimator. The processing block is connected to an output of each carrier phase estimator, outputs of the processing branches and at least one of the outputs of the phase adjusters and the outputs of the adaptive equalizer. The DSP unit may process a dual polarisation signal, each processing branch receiving a respective electrical signal output from the equalizer and corresponding to one state of polarization.

In an embodiment, each separate processing branch comprises two symbol sequence estimators arranged in parallel. Wherein one symbol sequence estimator receives an in-phase component and the other symbol sequence estimator receives a quadrature component of the signal output from the adaptive equalizer. The output of the carrier phase estimator of each branch is connected to the phase adjuster interconnecting the respective output port of the adaptive equalizer and the symbol sequence estimators. The DSP unit may therefore separately process in-phase and quadrature components of the signal output from the adaptive equalizer. The DSP unit may be used to process a dual polarisation quadrature phase shift keying, DP-QPSK, modulated signal.

In an embodiment, each processing branch comprises a respective forward error correcting, FEC, decoder connected to an output of each symbol sequence estimator, wherein the input of the CPE unit is taped from an output of the FEC decoder.

In an embodiment, the FEC decoder is a low-density parity-check, LDPC, decoder.

In an embodiment, the symbol sequence estimator is one of a maximum a posteriori, MAP, detector and a maximum likelihood sequence detector, MLSD.

In an embodiment, the channel response coefficients are for the Ungerboeck observation model, using a maximum likelihood sequence estimation, MLSE, algorithm.

In an embodiment, the maximum a posteriori, MAP, detector is a Bahl, Cocke, Jelinek, Raviv, BCJR, detector. Each BCJR detector and LDPC decoder pair iteratively exchange information to achieve maximum a posteriori probability, MAP, detection according to the turbo principle, as described for example in J. Hagenauer "The turbo principle: Tutorial introduction and state of the art," Proc. International Symposium on Turbo Codes and Related Topics. The DSP unit may ensure a proper distribution of tasks between the adaptive equalizer and the BCJR detectors, providing the right configuration of the adaptive equalizer and the detection metrics for the BCJR detectors.

In an embodiment, each BCJR detector is a $2^{L_T}$-state BCJR detector.

In an embodiment, the carrier phase estimator is a decision directed carrier phase estimation unit and the phase adjuster is a complex multiplier. Carrier phase estimation based on the Tikhonov parametrization algorithm and taking into account ISI may therefore be employed to cope with laser phase noise.

In an embodiment, the carrier phase estimator is a non-decision directed carrier phase estimation unit.

In an embodiment, the number of output ports is equal to the number of input ports.

In an embodiment, the adaptive equalizer is an adaptive 2D feed-forward equalizer, 2D-FFE. The 2D-FFE may compensate for linear propagation impairments, such as group-velocity dispersion, GVD, polarization rotations, and polarization-mode dispersion, PMD, and complete implementation of a matched filter within the DSP unit. The DSP unit may ensure a proper distribution of tasks between the 2D-FFE and the BCJR detectors, providing the right configuration of the 2D-FFE and the detection metrics for the BCJR detectors.

In an embodiment, the digital signal processing unit further comprises a compensator configured for compensating frequency offset between a first laser in a transmitter and a second laser in a receiver, said compensator being connected between the input and the adaptive equalizer.

In an embodiment, the digital signal processing unit further comprises an input for receiving electrical signal carrying a vector of samples. Each sample corresponds to different state of polarization. The input is operative to split the vector into separate signals each signal having different state of polarization.

In an embodiment, the input is for receiving an electrical signal carrying a column vector of samples comprising one complex sample per state of polarization.

The compensator is configured to compensate for the presence of any large and slowly varying frequency offset, $f_o$, between the first laser and the second laser. The digital signal processing unit is configured to obtain a frequency offset estimate, $\hat{f}_o$, is obtained during a training phase on a known training sequence by employing a frequency estimation algorithm. The frequency estimation algorithm described in U. Mengali and M. Morelli "Data-Aided Frequency Estimation for Burst Digital transmission", IEEE Transactions on Communications, vol. 45, no. 1, page 23, January 1997 may be used. The digital signal processing unit is configured to update the frequency offset estimate based on decided symbols.

In an embodiment, the digital signal processing unit has multiple pairs of inputs, for example 2, 4, 6 pairs of input ports, and comprises multiple copies of the adaptive equalizer, processing block and processing branch as described above.

A second aspect of the invention provides a coherent optical receiver for use in an optical communications network. The coherent optical receiver comprises an optical input, a splitter, a laser, two 2×2 90° optical hybrids, four pairs of balanced photodetectors and a digital signal processing unit. The optical input is arranged to receive an optical signal. The splitter arranged to split the received optical signal into two orthogonal states of polarization. The laser is arranged to operate as a local oscillator to generate a second optical signal. The two 2×2 90° optical hybrids are arranged to combine the optical fields of the two orthogonal states of polarization received from the splitter with the optical field of the second optical signal. A first two pairs of the photodetectors are connected to a first optical hybrid and a second two pairs of the photodetectors are connected to a second optical hybrid. The four pairs of photodetectors comprise four outputs arranged to output electrical signals representing in-phase and quadrature components of the two orthogonal states of polarization of the received optical signal. The four outputs are connected to four analog-to-digital converters and outputs of the four analog-to-digital converters are connected to the digital signal processing unit. The digital signal processing unit comprises an adaptive equalizer and a processing block. The adaptive equalizer comprises a number of input ports for receiving electrical signals and a number of output ports. Each electrical signal corresponds to a different state of polarization of an optical signal received by the coherent optical receiver. Each of the output ports is connected to a processing branch, wherein a processing branch comprises at least one symbol sequence estimator and a carrier phase estimator. The carrier phase estimator comprises an input for receiving signal taped from an output of the processing branch. An output of the carrier phase estimator is connected to a phase adjuster interconnecting the respective output port of the adaptive equalizer and the symbol sequence estimator. The processing block is connected to an output of the carrier phase estimator, an output of the processing branch and at least one of the output of the phase adjuster and the outputs of the adaptive equalizer.

The coherent receiver may distinguish between the ISI due to fiber propagation impairments (which is compensated for by the adaptive equalizer) and the ISI intentionally introduced by TFP (which is accounted for by the symbol sequence estimator). In this way, the DSP unit may ensure adaptation of the receiver and a proper distribution of tasks between the adaptive equalizer and the symbol sequence estimator. The DSP unit may enable signals having high ISI, as in the case of TFP, to be correctly received by the coherent receiver.

In an embodiment, the optical signal has a time-frequency packing modulation format. The DSP unit may enable signals having high ISI, as in the case of TFP, to be correctly received.

In an embodiment, the processing block is arranged to perform simultaneous channel response coefficients estimation and equalizer coefficients estimation. The processing block is arranged to provide resulting channel response coefficients to the symbol sequence estimator and to provide resulting equalizer coefficients to the adaptive equalizer. The DSP unit may distinguish between the ISI due to fiber propagation impairments and the ISI intentionally introduced by TFP, and may ensure a proper distribution of tasks between the adaptive equalizer and the symbol sequence estimator.

In an embodiment, the processing block is arranged to perform a gradient algorithm consisting of a first relationship for estimating the equalizer coefficients and a second relationship for estimating the channel response coefficients. The symbol sequence estimator is arranged to perform a symbol sequence estimation algorithm using the channel response coefficients. The DSP unit is based on a stochastic gradient algorithm, as in conventional coherent optical systems, but may distinguish between the ISI due to fiber propagation impairments and the ISI intentionally introduced by TFP. The DSP unit may therefore ensure a proper distribution of tasks between the adaptive equalizer and the symbol sequence estimator.

In an embodiment, the gradient algorithm is an iterative data-aided stochastic-gradient algorithm arranged to minimise an error, $e_k$, between a selected equalized signal sample output from the adaptive equalizer and an estimated channel sample. The DSP unit is based on a stochastic gradient algorithm, as in conventional coherent optical systems, but may distinguish between the ISI due to fiber propagation impairments and the ISI intentionally introduced by TFP. The DSP unit may therefore ensure a proper distribution of tasks between the adaptive equalizer and the symbol sequence estimator.

In an embodiment, the first relationship is arranged to estimate an equalizer coefficient, $C^{(k+1)}$, by subtracting a first update value from a preceding equalizer coefficient, $C^{(k)}$, the first update value being proportional to the error, $e_k$, and a second relationship for estimating a channel response coefficient, $h^{(k+1)}$, by adding a second update value to a preceding channel response coefficient, $h^{(k)}$, the second update value being proportional to the error, $e_k$. By using this variation of the stochastic-gradient algorithm the DSP unit may perform simultaneous channel response coefficients and equalizer coefficients estimation. This may enable the DSP unit to distinguish between the ISI due to fiber propagation impairments and the ISI intentionally introduced by TFP, and therefore ensure a proper distribution of tasks between the adaptive equalizer and the symbol sequence estimator.

In an embodiment, the first relationship is:

$$C_i^{(k+1)} = C_i^{(k)} - \alpha_c (g_k \circ e_k) s_{k-i}^\dagger, 0 \leq i \leq N_c - 1,$$

where $\alpha_c$ is a first step-size gain, $g_k$ is a column vector of phase estimates for a k-th equalized signal sample, $s_k$, and $N_c$ is a number of taps of the adaptive equalizer. The second relationship is:

$$h_i^{(k+1)} = h_i^{(k)} + \alpha_h (e_k \circ x_{k-i}^* + e_k^* \circ x_{k+i}), 1 \leq i \leq L_T,$$

where $\alpha_h$ is a second step-size gain, $x_{k+i}$ is a column vector of transmitted symbols and $L_T$ is a number of signal samples used by the symbol sequence estimator.

By using this variation of the stochastic-gradient algorithm the DSP unit may perform simultaneous channel response coefficients and equalizer coefficients estimation. This may enable the DSP unit to distinguish between the ISI due to fiber propagation impairments and the ISI intentionally introduced by TFP, and therefore ensure a proper distribution of tasks between the adaptive equalizer and the symbol sequence estimator. The relationships of this stochastic-gradient algorithm require knowledge of the transmitted symbols. While the equalizer coefficients need to be continuously updated to track variations of the fiber-optic channel, coefficients $\{h_i\}$ of the overall channel response do not change with time and can be estimated only once when setting up a link. The initial convergence of the algorithm can be guaranteed by the use of a known training sequence, while a slow tracking of the fiber channel can be achieved by updating only the equalizer coefficients according to the first relationship. This may be done at a much lower rate than the sampling rate, 1/T, and with a significant delay. This may allow the DSP unit to be used with pilot symbols and/or to replace transmitted symbols with final decisions (after successful decoding of the whole codeword), with a negligible impact on information rate and performance.

In an embodiment, the optical signal received by the coherent optical receiver carries a sequence of transmitted symbols and pilot symbols evenly inserted in the sequence at a rate $r_p$. The carrier phase estimator is configured to exploit the pilot symbols to provide a rough initial estimate of the carrier phase. This may enable the iterative data-aided stochastic-gradient algorithm to bootstrap, since at the first iteration, preliminary symbol decisions are not available.

In an embodiment, each of the output ports of the adaptive equalizer is connected to a separate processing branch. Each separate processing branch comprises at least one said symbol sequence estimator, a said carrier phase estimator and a phase adjuster interconnecting the respective output port of the adaptive equalizer and the at least one symbol sequence estimator. The processing block is connected to an output of each carrier phase estimator, outputs of the processing branches and at least one of the outputs of the phase adjusters and the outputs of the adaptive equalizer. The DSP unit may process a dual polarisation signal, each processing branch receiving a respective electrical signal output from the equalizer and corresponding to one state of polarization.

In an embodiment, each separate processing branch comprises two symbol sequence estimators arranged in parallel. Wherein one symbol sequence estimator receives an in-phase component and the other symbol sequence estimator receives a quadrature component of the signal output from the adaptive equalizer. The output of the carrier phase estimator of each branch is connected to the phase adjuster interconnecting the respective output port of the adaptive equalizer and the symbol sequence estimators. The DSP unit may therefore separately process in-phase and quadrature components of the signal output from the adaptive equalizer. The DSP unit may be used to process a dual polarisation quadrature phase shift keying, DP-QPSK, modulated signal.

In an embodiment, each processing branch comprises a respective forward error correcting, FEC, decoder connected to an output of each symbol sequence estimator, wherein the input of the CPE unit is taped from an output of the FEC decoder.

In an embodiment, the FEC decoder is a low-density parity-check, LDPC, decoder.

In an embodiment, the symbol sequence estimator is one of a maximum a posteriori, MAP, detector and a maximum likelihood sequence detector, MLSD.

In an embodiment, the channel response coefficients are for the Ungerboeck observation model, using a maximum likelihood sequence estimation, MLSE, algorithm.

In an embodiment, the maximum a posteriori, MAP, detector is a Bahl, Cocke, Jelinek, Raviv, BCJR, detector. Each BCJR detector and LDPC decoder pair iteratively exchange information to achieve maximum a posteriori probability, MAP, detection according to the turbo principle, as described for example in J. Hagenauer "The turbo principle: Tutorial introduction and state of the art," Proc. International Symposium on Turbo Codes and Related Topics. The DSP unit may ensure a proper distribution of tasks between the adaptive equalizer and the BCJR detectors, providing the right configuration of the adaptive equalizer and the detection metrics for the BCJR detectors.

In an embodiment, each BCJR detector is a $2^{L_T}$-state BCJR detector.

In an embodiment, the carrier phase estimator is a decision directed carrier phase estimation unit and the phase adjuster is a complex multiplier. Carrier phase estimation based on the Tikhonov parametrization algorithm and taking into account ISI may therefore be employed to cope with laser phase noise.

In an embodiment, the carrier phase estimator is a non-decision directed carrier phase estimation unit.

In an embodiment, the number of output ports is equal to the number of input ports.

In an embodiment, the adaptive equalizer is an adaptive 2D feed-forward equalizer, 2D-FFE. The 2D-FFE may compensate for linear propagation impairments, such as group-velocity dispersion, GVD, polarization rotations, and polarization-mode dispersion, PMD, and complete implementation of a matched filter within the DSP unit. The DSP unit may ensure a proper distribution of tasks between the 2D-FFE and the BCJR detectors, providing the right configuration of the 2D-FFE and the detection metrics for the BCJR detectors.

In an embodiment, the digital signal processing unit further comprises a compensator configured for compensating frequency offset between a first laser in a transmitter and a second laser in a receiver, said compensator being connected between the input and the adaptive equalizer.

In an embodiment, the digital signal processing unit further comprises an input for receiving electrical signal carrying a vector of samples. Each sample corresponds to different state of polarization. The input is operative to split the vector into separate signals each signal having different state of polarization.

In an embodiment, the input is for receiving an electrical signal carrying a column vector of samples comprising one complex sample per state of polarization. The compensator is configured to compensate for the presence of any large and slowly varying frequency offset, $f_o$, between the first laser and the second laser. The digital signal processing unit is configured to obtain a frequency offset estimate, $\hat{f}_o$, is obtained during a training phase on a known training sequence by employing the frequency estimation algorithm. The frequency estimation algorithm described in U. Mengali and M. Morelli "Data-Aided Frequency Estimation for Burst Digital transmission", IEEE Transactions on Communications, vol. 45, no. 1, page 23, January 1997 may be used. The digital signal processing unit is configured to update the frequency offset estimate based on decided symbols.

In an embodiment, the digital signal processing unit has multiple pairs of inputs, for example 2, 4, 6 pairs of input ports, and comprises multiple copies of the adaptive equalizer, processing block and processing branch as described above.

In an embodiment, the coherent optical receiver further comprises a polarization maintaining splitter arranged to split the second optical signal.

A third aspect of the invention provides a digital signal processing unit for use in an coherent optical receiver for an optical communications network, the digital signal processing unit comprising:

an adaptive 2D feed-forward equalizer, 2D-FFE, comprising ports for receiving the separate signals, each signal having a different state of polarization and a number of output ports equal to the number of polarization states at the input to the 2D-FFE equalizer, wherein each of the output ports is connected to a separate processing branch and wherein each processing branch comprises:

two BCJR detectors arranged in parallel for decoding error-correcting codes, wherein one BCJR detector receives an in-phase component and the other BCJR detector receives a quadrature component of the signal output from the 2D-FFE equalizer;

two LDPC decoders, each LDPC decoder connected to one of the BCJR detectors;

a decision-directed carrier phase estimation, CPE, unit comprising an input for receiving signals taped from outputs of the separate processing branches, wherein an output of the CPE unit being connected to a complex multiplier interconnecting output of the 2D-FFE equalizer and the BCJR detector wherein the digital signal processing unit further comprises a processing block connected to an output of the CPE units, outputs of the processing branches and at least to the outputs of the 2D-FFE equalizer or to the outputs of the complex multipliers.

In an embodiment, the digital signal processing unit further comprises an input for receiving electrical signal carrying a vector of samples, each sample corresponding to different states of polarization, wherein the input is operative to split the vector into separate signals each signal having different state of polarization.

A fourth aspect of the invention provides a coherent optical receiver for use in an optical communications network, the receiver comprising:

an optical input for receiving an optical signal;

a splitter (PBS) for splitting the received optical signal into two orthogonal states of polarization;

a laser operating as a Local Oscillator for generating a second optical signal;

two 2×4 90° optical hybrids for combining the optical in orthogonal states of polarization received from the splitter with the optical field of the local oscillator (LO) laser;

four pairs of balanced photodetectors, a first two pairs of the photodetectors connected to a first optical hybrid and a second two pairs of the photodetectors connected to a second optical hybrid;

the four pairs of photodetectors comprising four outputs for outputting electrical signals representing in-phase and quadrature components of the optical signal split into two orthogonal states of polarization received, said four outputs being connected to four analog-to-digital converters and outputs of the four analog-to-digital converters being connected to the digital signal processing unit according to the preceding embodiment.

A fifth aspect of the invention provides a method for digital signal processing of an optical communications signal in a coherent optical receiver. The method comprises steps a. to e. Step a. comprises receiving electrical signals, each electrical signal corresponding to a different state of polarization of an optical signal received by the optical receiver. Step b. comprises performing adaptive equalization on the samples to obtain equalized samples, the adaptive equalization using equalizer coefficients. Step c. comprises performing symbol sequence estimation on the equalized samples to obtain decided symbols. Step d. comprises performing carrier phase estimation on the decided symbols to obtain a phase compensation, and applying the phase compensation to the equalized samples. Step e. comprises performing simultaneous channel response coefficients estimation and equalizer coefficients estimation. Wherein step e. is repeated and steps b. to d. are performed iteratively using channel response coefficients and equalizer coefficients resulting from step e. until an error between the equalized samples after phase compensation and estimated channel samples is minimized.

This method may enable the ISI due to fiber propagation impairments (which is compensated for by the adaptive equalisation) to be distinguished from the ISI intentionally introduced by TFP (which is accounted for by the symbol sequence estimation). In this way, the method may ensure a proper distribution of tasks between the steps of adaptive equalisation and symbol sequence estimation. The method may enable signals having high ISI, as in the case of TFP, to be correctly received.

In an embodiment, the optical communications signal has a time-frequency packing modulation format. The method may enable TFP signals to be correctly received.

In an embodiment, step e. comprises performing a gradient algorithm consisting of a first relationship for estimating the equalizer coefficients and a second relationship for estimating the channel response coefficients. During each iteration, step b. is performed using the equalizer coefficients most recently estimated in step e. and step d. is performed using the channel response coefficients most recently estimated in step e. The method may enable ISI due to fiber propagation impairments to be distinguished from ISI intentionally introduced by TFP, and may ensure a proper distribution of tasks between the steps of adaptive equalisation and symbol sequence estimation. The method may enable signals having high ISI, as in the case of TFP, to be correctly received.

In an embodiment, the gradient algorithm is an iterative data-aided stochastic-gradient algorithm arranged to minimise an error, $e_k$, between the equalized samples after phase compensation and estimated channel samples is minimized. The method may provide an equalisation strategy that is based on a stochastic gradient algorithm, as in conventional coherent optical systems, but may distinguish between the ISI due to fiber propagation impairments and the ISI intentionally introduced by TFP. The method may ensure a proper distribution of tasks between the steps of adaptive equalisation and symbol sequence estimation.

In an embodiment, the first relationship is arranged to estimate an equalizer coefficient, $C^{(k+1)}$, by subtracting a first update value from a preceding equalizer coefficient, $C^{(k)}$, the first update value being proportional to the error, $e_k$, and a second relationship for estimating a channel response coefficient, $h^{(k+1)}$, by adding a second update value to a preceding channel response coefficient, $h^{(k)}$, the second update value being proportional to the error, $e_k$. By using this variation of the stochastic-gradient algorithm the method may perform simultaneous channel response coefficients and equalizer coefficients estimation. This may enable the method to distinguish between the ISI due to fiber propagation impairments and the ISI intentionally introduced by TFP and ensure a proper distribution of tasks between the steps of adaptive equalisation and symbol sequence estimation.

In an embodiment, the first relationship is:

$$C_i^{(k+1)} = C_i^{(k)} - \alpha_c (g_k \circ e_k) s_{k-i}^\dagger, 0 \leq i \leq N_c - 1,$$

where $\alpha_c$ is a first step-size gain, $g_k$ is a column vector of phase estimates for a k-th equalized signal sample, $s_k$, and $N_c$ is a number of taps of an adaptive equalizer used to perform the adaptive equalisation. The second relationship is:

$$h_i^{(k+1)} = h_i^{(k)} + \alpha_h (e_k \circ x_{k-i}^* + e_k^* \circ x_{k+i}), 1 \leq i \leq L_T,$$

where $\alpha_h$ is a second step-size gain, $x_{k+i}$ is a column vector of transmitted symbols and $L_T$ is a number of signal samples used to perform the symbol sequence estimation.

By using this variation of the stochastic-gradient algorithm the method may perform simultaneous channel response coefficients and equalizer coefficients estimation. This may enable the method to distinguish between the ISI due to fiber propagation impairments and the ISI intentionally introduced by TFP, and therefore ensure a proper distribution of tasks between the steps of adaptive equalisation and symbol sequence estimation. The relationships of this stochastic-gradient algorithm require knowledge of the transmitted symbols. While the equalizer coefficients need to be continuously updated to track variations of the fiber-optic channel, coefficients $\{h_i\}$ of the overall channel response do not change with time and can be estimated only once when setting up a link. The initial convergence of the algorithm can be guaranteed by the use of a known training sequence, while a slow tracking of the fiber channel can be achieved by updating only the equalizer coefficients according to the first relationship. This may be done at a much lower rate than the sampling rate, 1/T, and with a significant delay. This may allow the method to be used with pilot symbols and/or to replace transmitted symbols with final decisions (after successful decoding of the whole codeword), with a negligible impact on information rate and performance.

In an embodiment, the optical signal carries a sequence of transmitted symbols and pilot symbols evenly inserted in the sequence at a rate $r_p$. The carrier phase estimation of step d. is configured to exploit the pilot symbols to provide a rough initial estimate of the carrier phase. This may enable the iterative data-aided stochastic-gradient algorithm to bootstrap, since at the first iteration, preliminary symbol decisions are not available.

In an embodiment, steps b. to e. are performed separately on the samples corresponding to each state of polarisation.

In an embodiment, the samples corresponding to each state of polarisation comprise samples corresponding to an in-phase component of the electrical signal corresponding to the said state of polarisation and samples corresponding to a quadrature component of the electrical signal corresponding to the said state of polarisation. Steps c. to e. are performed separately on the in-phase component samples and the quadrature component samples.

In an embodiment, the method further comprises performing forward error correction on the decided symbols obtained in step c. and in step d. carrier phase estimation is performed on the decided symbols after forward error correction.

In an embodiment, the forward error correction is performed using a low-density parity-check, LDPC, forward error correction code.

In an embodiment, the symbol sequence estimation is performed using one of a maximum a posteriori, MAP, detection algorithm and a maximum likelihood sequence estimation algorithm, MLSD.

In an embodiment, the channel response coefficients are for the Ungerboeck observation model, using a maximum likelihood sequence estimation, MLSE, algorithm.

In an embodiment, the maximum a posteriori, MAP, estimation algorithm is a Bahl, Cocke, Jelinek, Raviv, BCJR, algorithm. The BCJR algorithm and the LDPC code iteratively exchange information to achieve maximum a posteriori probability, MAP, detection according to the turbo principle, as described for example in J. Hagenauer "The turbo principle: Tutorial introduction and state of the art," Proc. International Symposium on Turbo Codes and Related Topics.

In an embodiment, the BCJR algorithm is a $2^{L_T}$-state BCJR algorithm.

In an embodiment, the carrier phase estimation is decision directed carrier phase estimation. Carrier phase estimation based on the Tikhonov parametrization algorithm and taking into account ISI may therefore be employed to cope with laser phase noise.

In an embodiment, the carrier phase estimation is non-decision directed carrier phase estimation.

In an embodiment, the method further comprises compensating frequency offset between a first laser used to generate the optical signal and a second laser in the coherent optical receiver. The frequency offset compensation is performed between step a. and step b.

In an embodiment, the method further comprises receiving electrical signal carrying a vector of samples. Each sample corresponds to different state of polarization. The method comprises splitting the vector into separate signals each signal having different state of polarization, said separate signals forming the signals received in step a.

In an embodiment, the method comprises receiving an electrical signal carrying a column vector of samples comprising one complex sample per state of polarization. The method further comprises compensating for the presence of any large and slowly varying frequency offset, $f_o$, between a first laser used to generate the optical signal and a second laser in the coherent optical receiver. The method comprises obtaining a frequency offset estimate, $\hat{f}_o$, is obtained during a training phase on a known training sequence by employing a frequency estimation algorithm. The frequency estimation algorithm described in U. Mengali and M. Morelli "Data-Aided Frequency Estimation for Burst Digital transmission", IEEE Transactions on Communications, vol. 45, no. 1, page 23, January 1997 may be used. The method comprises updating the frequency offset estimate based on decided symbols. The frequency offset compensation is performed between step a. and step b.

In an embodiment, the adaptive equalisation is adaptive 2D feed-forward equalisation, 2D-FFE. This may enable the method to compensate for linear propagation impairments, such as group-velocity dispersion, GVD, polarization rotations, and polarization-mode dispersion, PMD, and complete implementation of a matched filter.

A computer program, comprising instructions which, when executed on at least one processor, cause the at least one processor to carry out the method for digital signal processing of an optical communications signal in a coherent optical receiver.

A carrier containing the computer program described above. The carrier is one of an electronic signal, optical signal, radio signal, or computer readable storage medium.

Embodiments of the invention will now be described, by way of example only, with reference to the accompanying drawings.

DETAILED DESCRIPTION

The same reference numbers will used for corresponding features in different embodiments.

Figure 1:
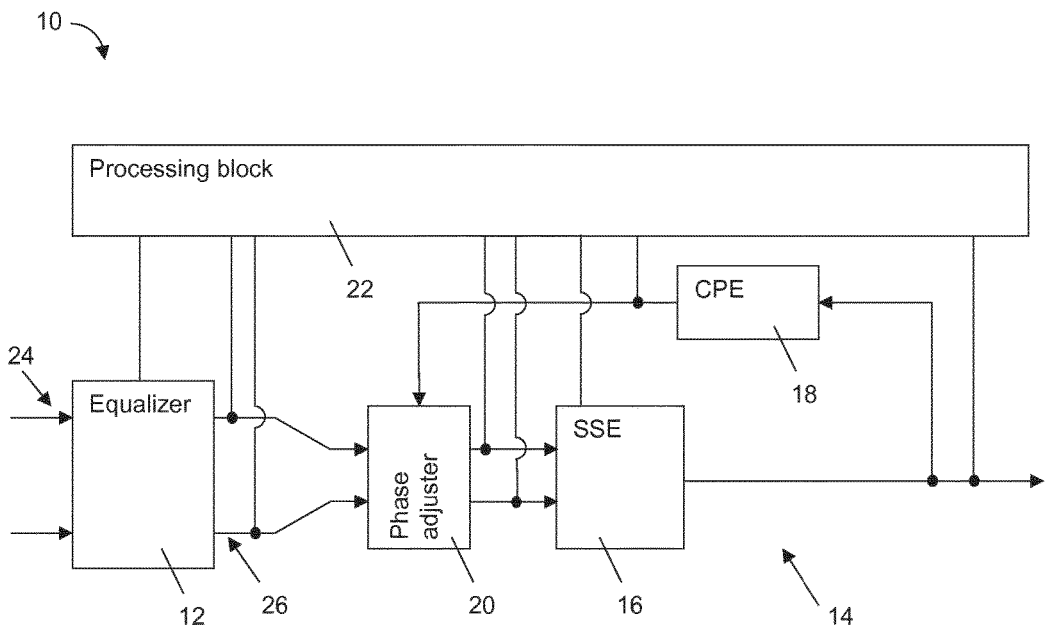
FIG. 1 is a schematic representation of a digital signal processing unit according to a first embodiment of the invention.

Referring to FIG. 1, a first embodiment of the invention provides a digital signal processing, DSP, unit 10 for use in a coherent optical receiver for an optical communications network. The DSP unit comprises an adaptive equalizer 12 and a processing block 22.

The adaptive equalizer 12 comprises a number of input ports 24 for receiving electrical signals. Each electrical signal corresponds to a different state of polarization of an optical signal received by the coherent optical receiver. The adaptive equalizer further comprises a number of output ports 26. In this embodiment, the number of output ports is equal to the number of the input ports but there may alternatively be fewer output ports than input ports. Each of the output ports is connected to a processing branch 14, which comprises a symbol sequence estimator, SSE, 16, a carrier phase estimator, CPE, 18, and a phase adjuster 20. The CPE comprises an input for receiving signal taped from an output of the processing branch. An output of the CPE is connected to the phase adjustment adjuster. The phase adjuster interconnects the respective output port of the adaptive equalizer and the SSE.

The processing block 22 is connected to an output of the CPE, an output of the processing branch, the output of the phase adjuster and the outputs of the adaptive equalizer.

Figure 2:
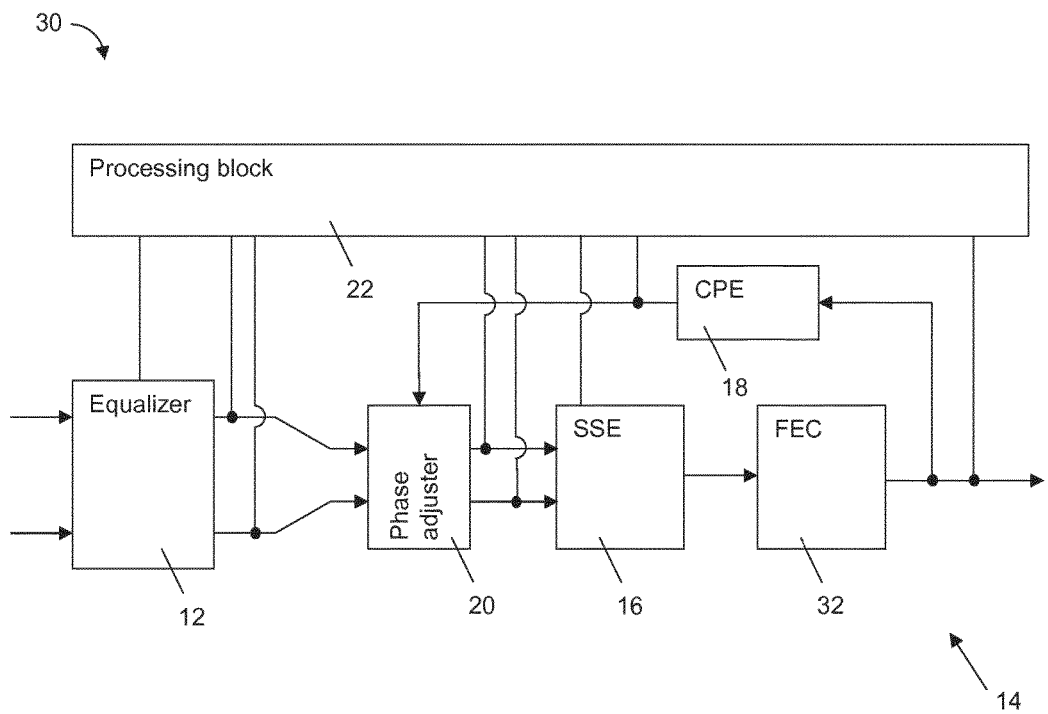
FIG. 2 is a schematic representation of a digital signal processing unit according to a second embodiment of the invention.

FIG. 2 shows a DSP unit 30 according to a second embodiment of the invention. The DSP unit 30 of this embodiment is similar to the DSP unit 10 of the previous embodiment, with the addition of a forward error correcting, FEC, decoder 32 connected to an output of the SSE 16. The input of the CPE 22 is taped from an output of the FEC decoder.

In a third embodiment, the processing block is arranged to perform simultaneous channel response coefficients estimation and equalizer coefficients estimation, and is arranged to provide the resulting channel response coefficients to the SSE 16 and to provide the resulting equalizer coefficients to the adaptive equalizer 12.

In fourth embodiment, the processing block 22 is arranged to perform a gradient algorithm consisting of a first relationship for estimating the equalizer coefficients and a second relationship for estimating the channel response coefficients. The SSE 16 is arranged to perform a symbol sequence estimation algorithm using the channel response coefficients.

In a fifth embodiment, the gradient algorithm performed by the processing block 22 is an iterative data-aided stochastic-gradient algorithm arranged to minimise an error, $e_k$, between a selected equalized signal sample output from the adaptive equalizer and an estimated channel sample.

In a sixth embodiment, the processing block 22 is arranged to perform a gradient algorithm consisting of a first relationship and a second relationship. The first relationship is arranged to estimate an equalizer coefficient, $C^{(k+1)}$, by subtracting a first update value from a preceding equalizer coefficient, $C^{(k)}$. The first update value is proportional to the error, $e_k$, between a selected equalized signal sample output from the adaptive equalizer and an estimated channel sample. The second relationship is arranged to estimate a channel response coefficient, $h^{(k+1)}$, by adding a second update value to a preceding channel response coefficient, $h^{(k)}$. The second update value is proportional to the error, $e_k$.

In a seventh embodiment, the processing block 22 is arranged to perform a gradient algorithm consisting of a first relationship and a second relationship. The first relationship is:

$$c_i^{(k+1)} = c_i^{(k)} - \alpha_c (g_k \circ e_k) s_{k-i}^\dagger, 0 \leq i \leq N_c - 1,$$

where $\alpha_c$ is a first step-size gain, $g_k$ is a column vector of phase estimates for a k-th equalized signal sample, $s_k$, and $N_c$ is a number of taps of the adaptive equalizer.

The second relationship is:

$$h_i^{(k+1)} = h_i^{(k)} + \alpha_h (e_k \circ x_{k-i}^* + e_k^* \circ x_{k+i}), 1 \leq i \leq L_T,$$

where $\alpha_h$ is a second step-size gain, $x_{k+i}$ is a column vector of transmitted symbols and $L_T$ is a number of signal samples used by the symbol sequence estimator.

Though the channel response has in principle an infinite length, we can consider only a finite number of samples for digital processing purposes. Hence L defines the number of samples used to estimate the error so that the considered channel length is 2L+1. $L_T$ is the number of samples used by the symbol sequence estimator. Usually $L_T<L$ since the complexity of the SSE exponentially grows with L.

Figure 3:
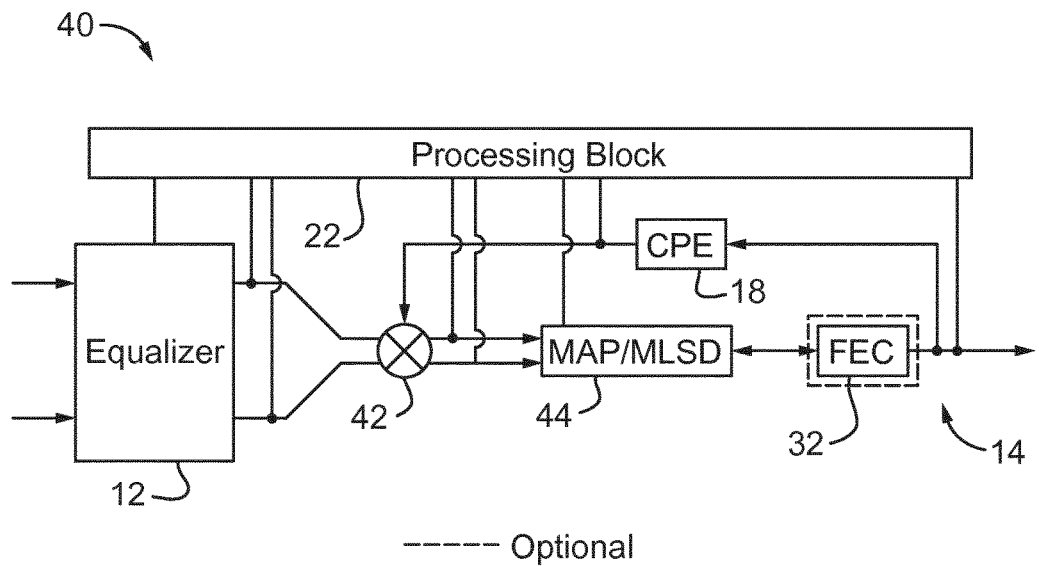
FIG. 3 is a schematic representation of a digital signal processing unit according to an eighth embodiment of the invention.
Figure 4:
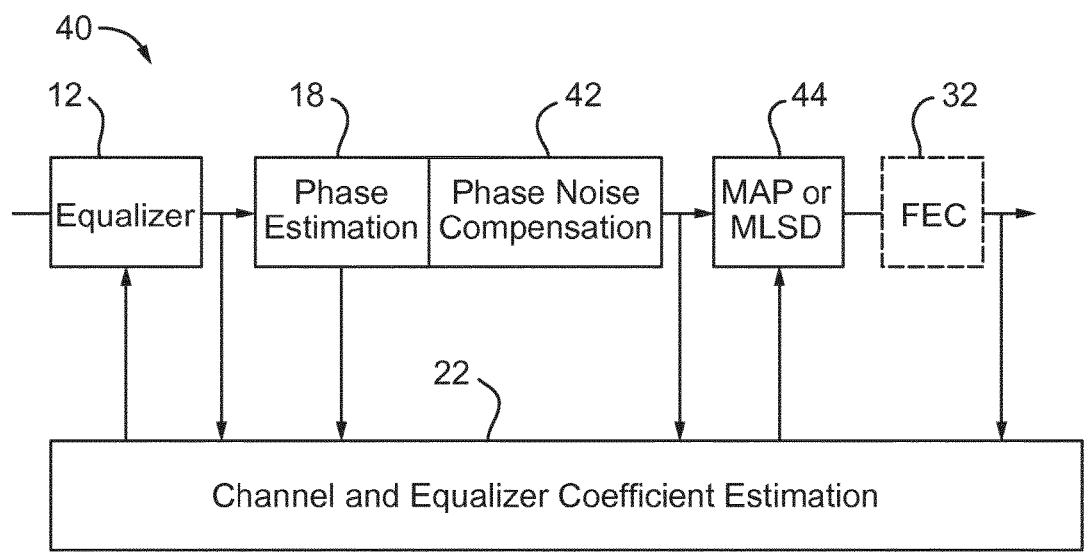
FIG. 4 is a functional representation of the digital signal processing unit of FIG. 3.

An eighth embodiment of the invention provides a DSP unit 40 as shown in FIGS. 3 and 4. In this embodiment, the symbol sequence estimator is one of a maximum a posteriori, MAP, detector 44 and a maximum likelihood sequence detector, MLSD 44. The phase adjuster is a complex multiplier 42. Electrical signals corresponding to both orthogonal states of polarization are processed in one processing branch 14.

FIG. 4 illustrates in a more schematic way the structure and connections of the digital signal processing unit 40. The arrows from the processing block 22, which performs channel and equalizer coefficient estimation, indicate that the processing block provides the coefficients to the equalizer and the estimated channel samples to the symbol sequence estimator, in this embodiment a MAP detector or MLSD detector.

FIGS. 3 and 4 show a forward error correction, FEC, decoder 32 in dashed outline, indicating that this element is optional.

Figure 5:
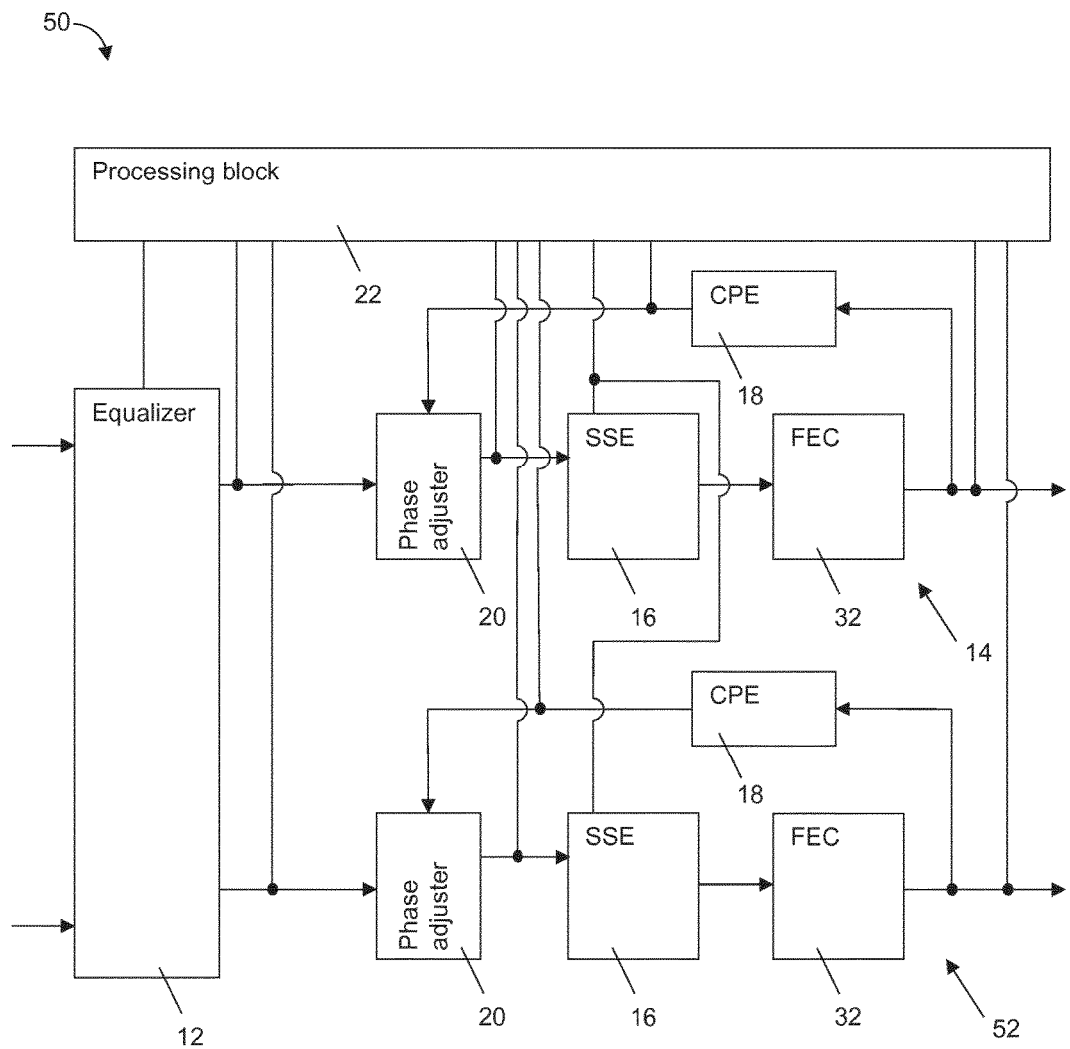
FIG. 5 is a schematic representation of a digital signal processing unit according to a ninth embodiment of the invention.

FIG. 5 shows a DSP unit 50 according to a ninth embodiment of the invention. In this embodiment, each of the output ports of the adaptive equalizer is connected to a separate processing branch 14, 52, as described above. Each processing branch comprises an SSE 16, a carrier phase estimator, CPE, 18 and a phase adjuster 20 interconnecting the respective output port of the adaptive equalizer and the SSE.

The processing block 22 is connected to an output of each CPE 18, outputs of the processing branches, the outputs of the phase adjusters and the outputs of the adaptive equalizer. Each processing branch is also shown including a FEC decoder 32 but it will be appreciated that this is, again, optional.

Figure 6:
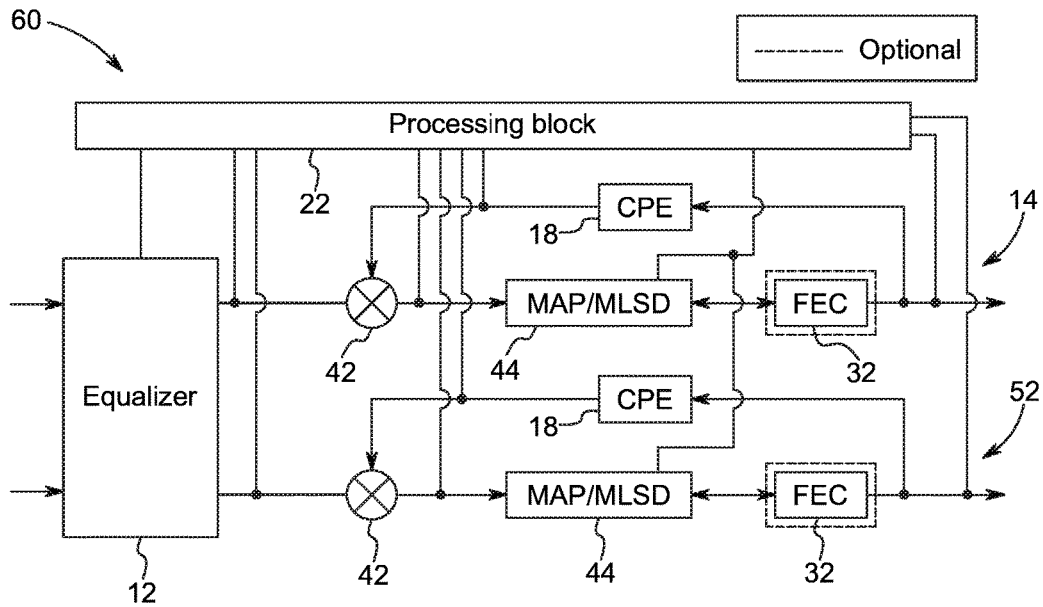
FIG. 6 is a schematic representation of a digital signal processing unit according to a tenth embodiment of the invention.

FIG. 6 shows a DSP unit 60 according to a tenth embodiment of the invention. In this embodiment, the SSE is one of a maximum a posteriori, MAP, detector 44 and a maximum likelihood sequence detector, MLSD 44. The phase adjuster is a complex multiplier 42. Electrical signals corresponding to orthogonal states of polarization are processed separately in respective processing branches 14, 52.

Figure 7:
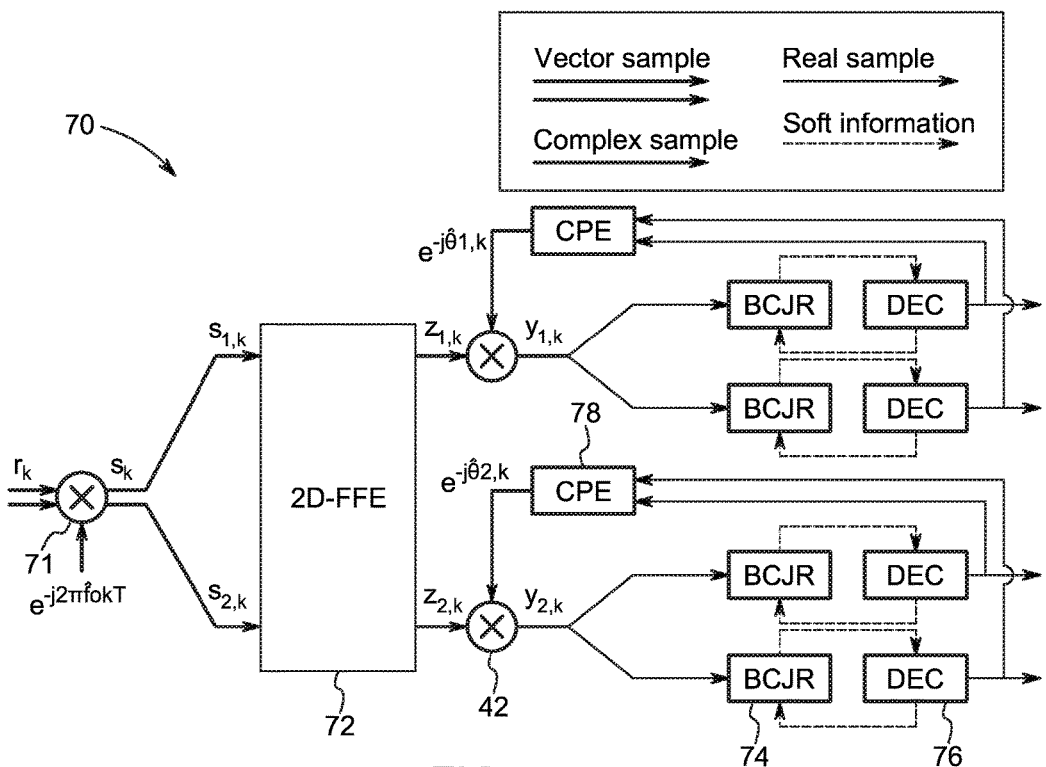
FIG. 7 is a schematic representation of a digital signal processing unit according to an eleventh embodiment of the invention.

FIG. 7 shows a DSP unit 70 according to an eleventh embodiment of the invention. In this embodiment, the adaptive equalizer is a 2D feed forward equalizer, FFE, 72. The carrier phase estimator, CPE, 78 is a decision directed carrier phase estimation unit and the phase adjuster is a complex multiplier 42. The SSE is a maximum a posteriori, MAP, detector in the form of a Bahl, Cocke, Jelinek, Raviv, BCJR, detector 74. The DSP unit 70 additionally comprises a FEC decoder, DEC, 76 which takes the form of a Low-Density Parity-Check, LDPC, decoder.

In this embodiment, each processing branch comprises a pair of BCJR detectors 74 and a pair of FEC decoders 76. The in-phase component and the quadrature component of each polarisation are processed separately in a respective BCJR detector FEC decoder set.

The DSP unit 70 further comprises a compensator (not shown) configured for compensating frequency offset between a first laser in a transmitter and a second laser in a receiver. The compensator is connected between the input and the 2D-FFE by way of a second complex multiplier 74.

The k-th received column vector of samples $r_k=(r_{1,k}; r_{2,k})T$ (one complex sample per state of polarization) is first processed to compensate for the presence of any large and slowly varying frequency offset $f_o$ between the transmit and receive lasers. The estimate $\hat{f}_o$ is obtained during a training phase (on a known training sequence) by employing the frequency estimation algorithm described in U. Mengali and M. Morelli "Data-Aided Frequency Estimation for Burst Digital transmission", IEEE Transactions on Communications, vol. 45, no. 1, page 23, January 1997, and then slowly updated based on decisions. Compensated samples $$s_k = r_k e^{-j2\pi \hat{f}_0 kT}$$

are then processed by the adaptive 2D $N_c$-tap synchronous feed-forward equalizer, 2D-FFE 72 that compensates for linear propagation impairments, such as group-velocity dispersion, GVD, polarization rotations, and polarization-mode dispersion, PMD, and completes the implementation of the matched filter.

At the output of the 2D-FFE 72 the components $z_{1,k}$ and $z_{2,k}$ of the equalized samples $z_k$ are then separated and independently processed. For each component, decision directed carrier phase estimation based on the Tikhonov parametrization algorithm and taking into account ISI is employed to cope with the laser phase noise. Finally, the in-phase and quadrature components of the compensated samples and are separated and sent to the four parallel $2^{L_T}$-state BCJR, detectors 74, followed by the four Low-Density Parity-Check, LDPC, decoders 76. The BCJR detectors and LDPC decoders iteratively exchange information to achieve maximum a posteriori probability, MAP, detection according to the turbo principle, as described for example in J. Hagenauer's article "The turbo principle: Tutorial introduction and state of the art," in Proc. International Symposium on Turbo Codes and Related Topics.

At each iteration, as new (more accurate) preliminary decisions are available from the decoders, the CPEs 78 update the phase estimates $\hat{\theta}_{1,k}$ and $\hat{\theta}_{2,k}$ and a new set of compensated samples $y_{1,k}$ and $y_{2,k}$ is fed to the BCJR detectors. At the first iteration, as preliminary decisions are not available, the CPEs exploit pilot symbols, evenly inserted in the transmitted sequence at rate rp, to provide a rough initial estimate of the phase and make the iterative process bootstrap.

Figure 12:
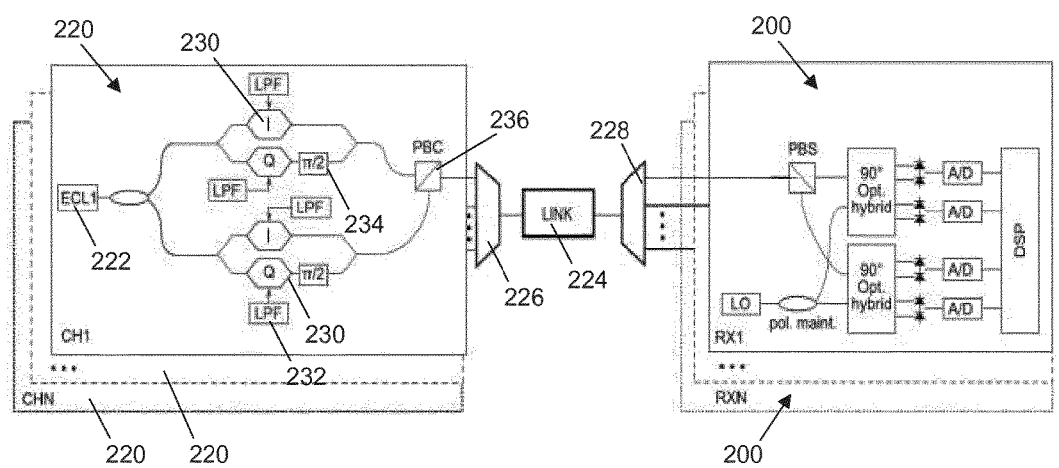
FIG. 12 is a schematic representation of an optical communications network comprising the coherent optical receiver of FIG. 11.

Considering an optical communications network as shown in FIG. 12, and that the amplified-spontaneous-emission, ASE, noise accumulated during propagation of the optical signal across an optical fibre link 224 of the optical communications network can be modelled as independent additive white Gaussian noise, AWGN, on each polarization at the input (or, equivalently, at the output) of the fiber, and that the transfer matrix of the fiber $H_f(f)$ (in the linear regime) is unitary, i.e, $H_f(f)^{-1}=H_f(f)^\dagger$, the required transfer matrix of the adaptive equalizer should be $$H_{eq}(f)=H_f(f)^\dagger P(f)^*/H_{fe}(f) \qquad (1)$$

where $H_{fe}(f)$ is the low-pass equivalent transfer function of the optoelectronic front-end of the coherent receiver 200 (accounting for optical filter, photodetector, and analog-to-digital, A/D, converter) and P(f) is the Fourier transform of the transmitted pulse shape (accounting for the driver, modulator, and filters of the transmitter 220). In this case, as required, the corresponding overall channel transfer matrix would be $H(f)=|P(f)|^2 I$, where I is the 2×2 identity matrix, independently of the actual transfer matrix of the fiber.

The evaluation of (1) requires an accurate characterization of transmitter and receiver front-end, and an adaptive estimate of the fiber transfer matrix $H_f(f)$. Here we configure the equalizer according to (1), without requiring a separate knowledge of $H_f(f)$, $P(f)$, and $H_{fe}(f)$, as follows.

Denoting by $s_k$ the k-th column vector of samples at the input of the equalizer (one complex sample per state of polarization) and by $C_i$ the 2×2 matrix of coefficients of the i-th tap of the equalizer, the equalized samples are given by $$z_k = \sum_{i=0}^{N_c-1} C_i s_{k-i} \quad (2)$$

Denoting by $x_k$ the k-th column vector of transmitted symbols, by $h_i$ the column vector of the two i-th coefficients of the desired (but unknown) overall impulse responses at the output of the matched filter (one per polarization), and by $$g_k = (e^{j\theta_1,k}, e^{j\theta_2,k})^T$$

the column vector of the phase estimates for the k-th samples on the two polarizations (obtained from a separate carrier phase estimation algorithm), the error with respect to the desired channel response is $$e_k = g_k^* \circ z_k - \sum_{i=-L}^{L} h_i \circ x_{k-i} \quad (3)$$

where ∘ denotes the Hadamard (entrywise) product. Following the same approach used in G. Ungerboeck, "Adaptive maximum-likelihood receiver for carrier-modulated datatransmission systems", IEEE Trans. Commun., vol. 22, pp. 624 636, May 1974, for the single-polarization case without phase noise, it can be demonstrated that the variance of each element of (3) is minimum when the matched filter condition is met, i.e., when $H_f(f)H_{fe}(f)H_{eq}(f)=P^*(f)I$. Given the unitary nature of $H_f(f)$, this is equivalent to (1) and provides the desired overall response $H(f)=|P(f)|^2 I$.

Thus, both the required equalizer coefficients (to compensate fiber impairments and perform matched filtering) and the desired channel coefficients of the Ungerboeck observation model can be simultaneously estimated by an iterative data-aided stochastic-gradient algorithm that minimizes the variance of (3). By holding ho constant (to an arbitrary value) and forcing the symmetry condition $h_{-i}=h^*_i$, the update law for the equalizer coefficients, i.e. the first relationship of the gradient algorithm, and the estimated channel coefficients, i.e. the second relationship of the gradient algorithm are, respectively:

$$C_i^{(k+1)} = C_i^{(k)} - \alpha_c (g_k \circ e_k) s_{k-i}^\dagger, 0 \le i \le N_c-1,$$

and $$h_i^{(k+1)} = h_i^{(k)} + \alpha_h (e_k \circ x_{k-i}^* + e_k^* \circ x_{k+i}), 1 \le i \le L_T,$$

The second relationship is a "symmetric" variant of the gradient algorithm using two samples ($x_{k-1}$ and $x_{k+1}$) instead of one.

The first and second relationships require knowledge of the transmitted symbols. While the equalizer coefficients need to be continuously updated to track variations of the fiber-optic channel, coefficients $\{h_i\}$ of the overall channel response do not change with time and can be estimated only once when setting up the link.

The initial convergence of the algorithm can be guaranteed by the use of a known training sequence, while a slow tracking of the fiber channel can be achieved by updating only the equalizer coefficients according to the first relationship, possibly at a much lower rate than 1/T and with a significant delay. This is because, as variations of the fiber-optic channel typically take place on a time scale of milliseconds, the channel remains approximately constant over many consecutive codewords. This allows the use of pilot symbols and/or the replacement of transmitted symbols with final decisions (after successful decoding of the whole codeword), with a negligible impact on information rate and performance.

The computation of the channel metric for the BCJR algorithm requires knowledge of the channel coefficients $\{h_i\}$ and of the noise variance. Thus, once estimated by the second relationship, channel coefficients are passed to the BCJR detectors 74 together with an estimate of the variance of (3).

Figure 8:
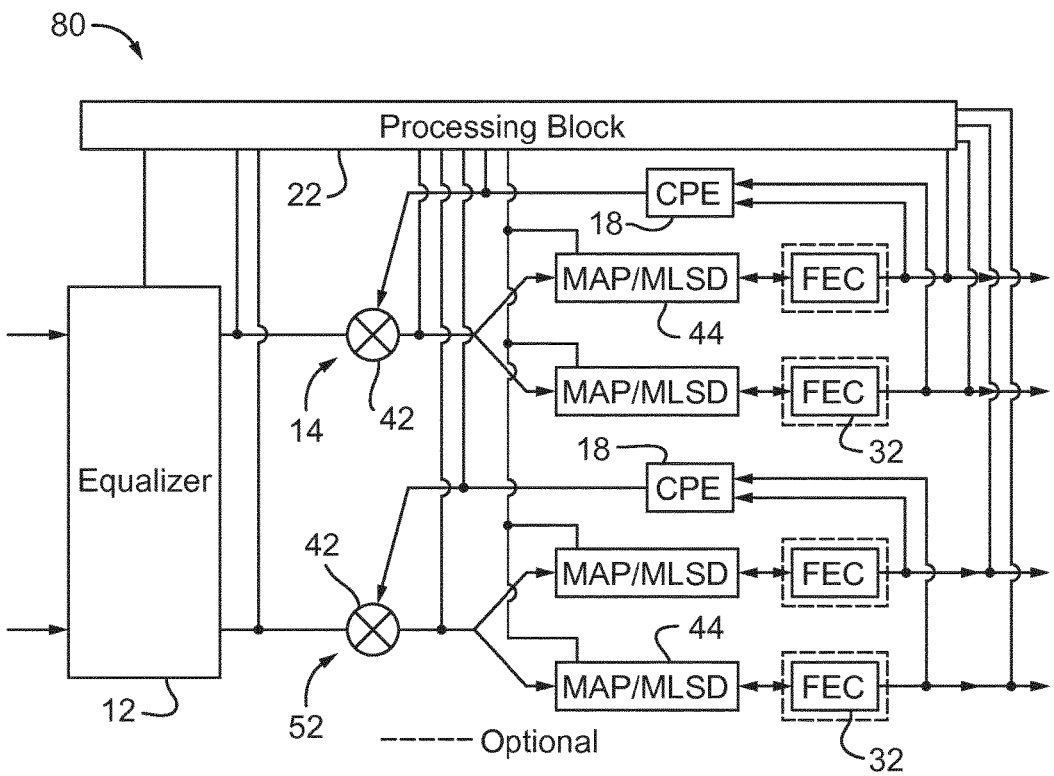
FIG. 8 is a schematic representation of a digital signal processing unit according to a twelfth embodiment of the invention.

FIG. 8 shows a DSP unit 80 according to a twelfth embodiment of the invention. The DSP unit of this embodiment has the same general structure as the DSP unit 70 of the previous embodiment, being arranged to separately process the in-phase component and the quadrature component of each polarisation, but the SSE may be either a MAP detector or an MLSD detector 44 and FEC decoders 32 are optionally included.

Figure 9:
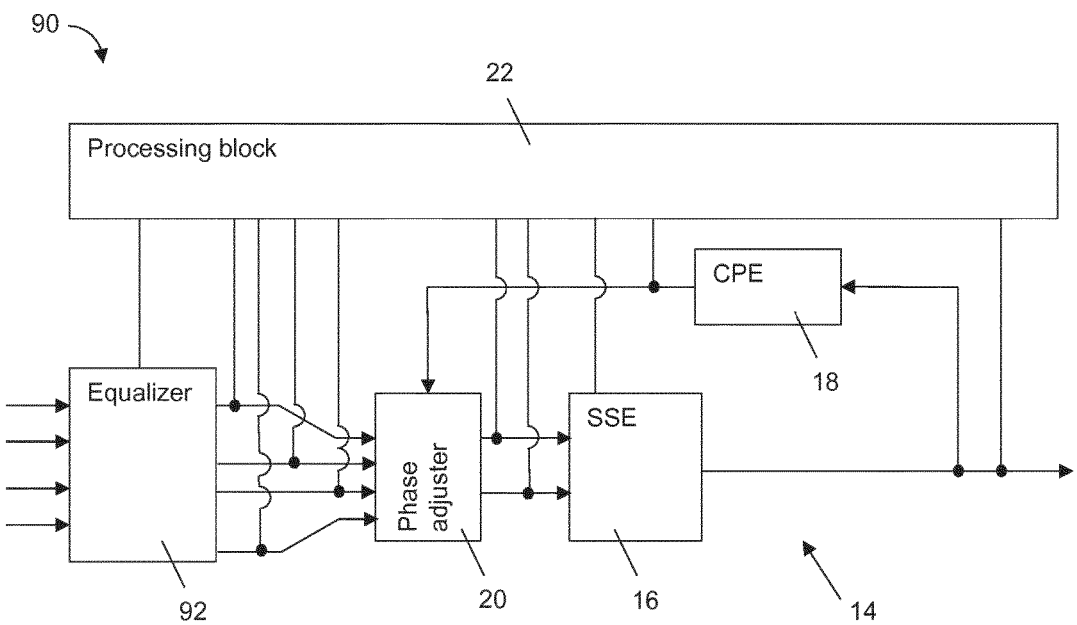
FIG. 9 is a schematic representation of a digital signal processing unit according to a thirteenth embodiment of the invention.

FIG. 9 shows a DSP unit 90 to a thirteenth embodiment of the invention. The DSP unit of this embodiment is similar to the DSP unit 10 of FIG. 1 but the adaptive equalizer 92 has four inputs and four outputs, for the in-phase and quadrature components of each of two polarisations respectively.

Figure 10:
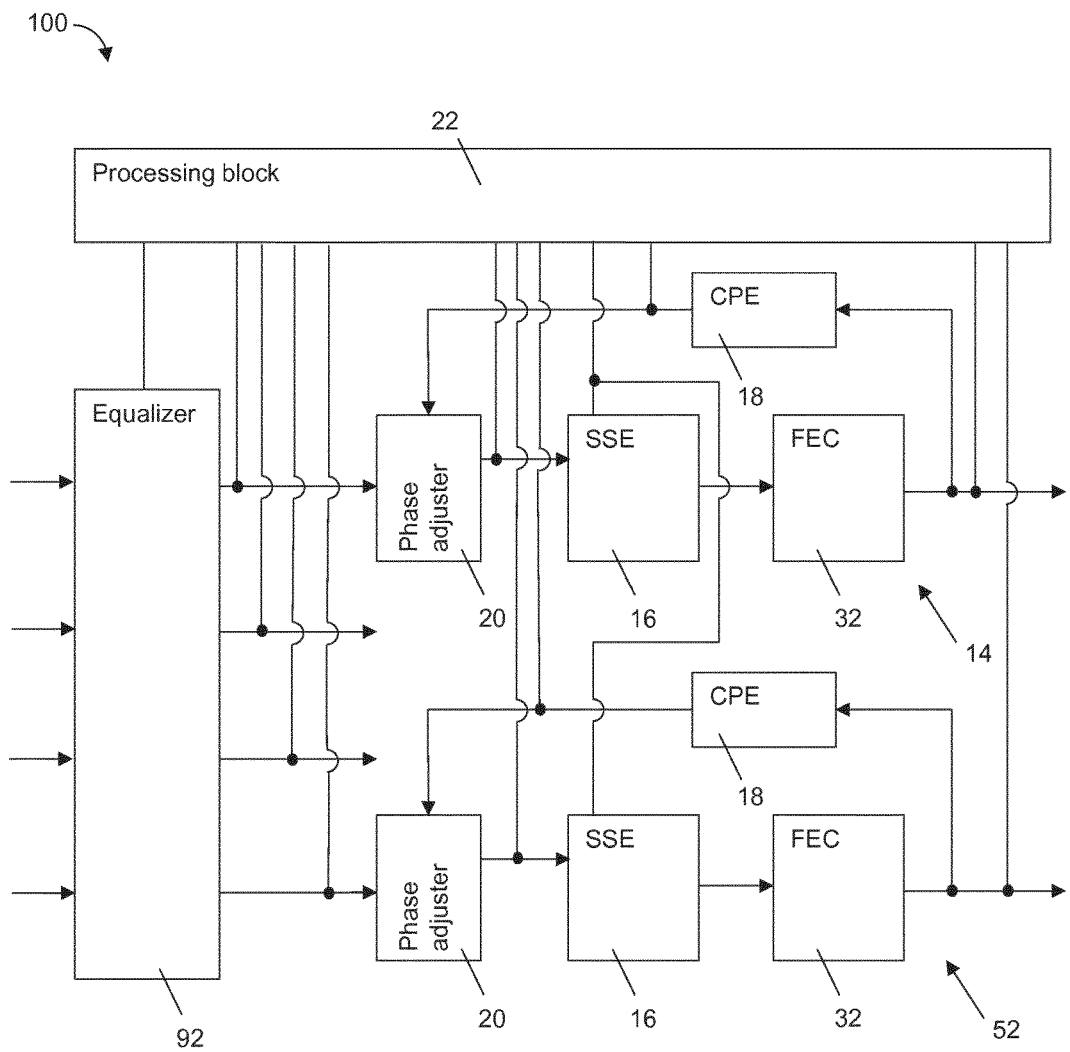
FIG. 10 is a schematic representation of a digital signal processing unit according to a fourteenth embodiment of the invention.

FIG. 10 shows a DSP unit 100 to a fourteenth embodiment of the invention. The DSP unit of this embodiment is similar to the DSP unit 50 of FIG. 5, but has an adaptive equalizer 92 having four inputs and four outputs, for the in-phase and quadrature components of each of two polarisations respectively.

Each output of the adaptive equalizer 92 is connected to a respective processing branch 14, 52 (only two are shown in the drawing for reasons of clarity and compactness).

Figure 11:
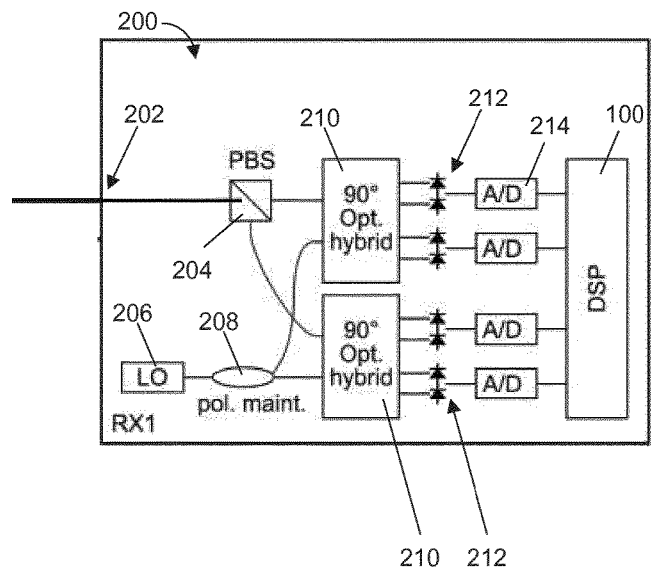
FIG. 11 is a schematic representation of a coherent optical receiver according to a fifteenth embodiment of the invention.

Referring to FIG. 11, a fifteenth embodiment of the invention provides a coherent optical receiver 200 for use in an optical communications network, as shown in FIG. 12.

The coherent optical receiver comprises an optical input 202 arranged to receive an optical signal, a splitter 204, a laser 206, two 2×2 90° optical hybrids 210, four pairs of balanced photodetectors 212 and a DSP unit 100.

The splitter 204 is a polarizing beam splitter, PBS, arranged to split the received optical signal into two orthogonal states of polarization. The laser 206 is arranged to operate as a local oscillator, LO, to generate a second optical signal. The second optical signal is split by a polarisation maintaining coupler 208 and part of the second optical signal is delivered to each of the 90° optical hybrids.

The two 2×2 90° optical hybrids 210 are arranged to combine the optical fields of the two orthogonal states of polarization received from the splitter with the optical field of the second optical signal. A first two pairs of the photodetectors 212 are connected to a first optical hybrid and a second two pairs of the photodetectors connected to a second optical hybrid.

The four pairs of photodetectors 212 comprise four outputs arranged to output electrical signals representing in-phase and quadrature components of the two orthogonal states of polarization of the received optical signal. The four outputs are connected to four analog-to-digital, A/D, converters 214. The outputs of the four analog-to-digital converters are connected to the DSP unit 100.

The DSP unit 100 is as described above with reference to FIG. 10 but it will be appreciated that any of the DSP units 10, 30, 40, 50, 60, 70, 80, 90 described above may alternatively be used.

FIG. 12 shows transmitters 220 and receivers 200 of an optical communications network using time-frequency packing, TFP, and dual-polarisation quadrature phase shift keying, DP-QPSK, modulation. The network can be implemented by using the same hardware configuration typically used for WDM systems based on coherent detection.

Since the network may employ single-user detectors, an independent transmitter 220 and receiver 200 pair is used per each optical carrier, CH1-CHN. Each optical carrier is thus generated at the desired wavelength, for example using an external-cavity laser, ECL, 222, modulated, optically multiplexed 226 with the modulated carriers generated by the other transmitters 220, transmitted through the optical link 224, extracted by an optical demultiplexer 228, and independently detected. In each transmitter, the in-phase, I, and quadrature, Q, components of two orthogonal states of polarization are independently and linearly modulated by a pair of nested Mach-Zender modulators, MZMs, 230. The desired pulse shape p(t) may be obtained either operating on the electrical signals that drive the modulator, using a low-pass filter, LPF, 232 as shown, or operating on the optical signal after the modulator, using an optical band-pass filter, provided that, for example, the overall equivalent low-pass impulse response of the transmitter (driver, modulator, electrical filter and/or optical filter) is p(t) and that linearity of the modulator is preserved by employing a driving voltage significantly lower than the modulator Va.

An alternative modulation scheme, where linear modulation is obtained by operating the MZM at its maximum driving voltage, to reduce its insertion loss, may also be devised. For instance, by using an additional MZM as a pulse carver and employing optical filtering to obtain the desired pulse shape p(t) as well as bandwidth and time, BT, product, the nonlinearity of the MZM affects only (and slightly) the overall pulse shape p(t), but does not introduce nonlinear ISI. However, the insertion loss saved by increasing the MZM driving voltage would be replaced by the additional loss introduced by the pulse carver and optical filter. Another possible implementation is based on an arrayed waveguide grating device that filters and multiplexes all the frequency sub-channels in the optical domain.

In the network shown in FIG. 12, we consider a modulation scheme based on a single MZM, driven at low voltage, and analogue electrical filtering which, at the present, seems to be the most practical choice in terms of cost and complexity. Moreover, the choice of p(t) is not critical and a reasonably good performance can be obtained by employing available analogue low-pass filters.

At the receiver side, each optical carrier is demodulated by employing a phase-diversity and polarization-diversity coherent detection scheme. After optical demultiplexing, each carrier is split into two orthogonal states of polarizations, by the PBS 204, which are then separately combined with the optical field of a local oscillator, LO, laser in a 90° optical hybrid and detected with two pairs of balanced photodetectors. The four resulting electrical signals, i.e. the in-phase and quadrature components of each state of polarization, are then sampled by an analog-to-digital converter, A/D, with a bandwidth at least equal to the total bandwidth of the shaping pulse p(t) and twice the sampling rate. The remaining part of receiver processing is digitally implemented by the DSP 100, assuming a sampling rate of 1/T. Note that, since TFP is employed, the required bandwidth and sampling rate are typically lower than 1/(2T) and 1/T, respectively, and digital up-sampling can be employed to achieve the 1/T rate required for symbol-time processing, without any performance degradation.

In operation, the processing block 22 performs simultaneous channel estimation and equalizer coefficients calculation. The processing block takes as inputs: the outputs of the equalizer 92 or the outputs of phase noise compensation units formed by the CPEs 18 and the phase adjusters 20; the output of the carrier phase estimators, CPE; the decided symbols or symbols from known training sequence or pilot symbols. An estimated channel response includes everything in between transmitter and phase noise compensation unit. Estimated channel response and equalizer coefficients are simultaneously and iteratively estimated so that the error, $e_k$, between the output of the phase noise compensation unit and the output of the estimated channel, when the training sequence or pilot symbols, or the decided symbols are taken as input, is minimized.

Figure 13:
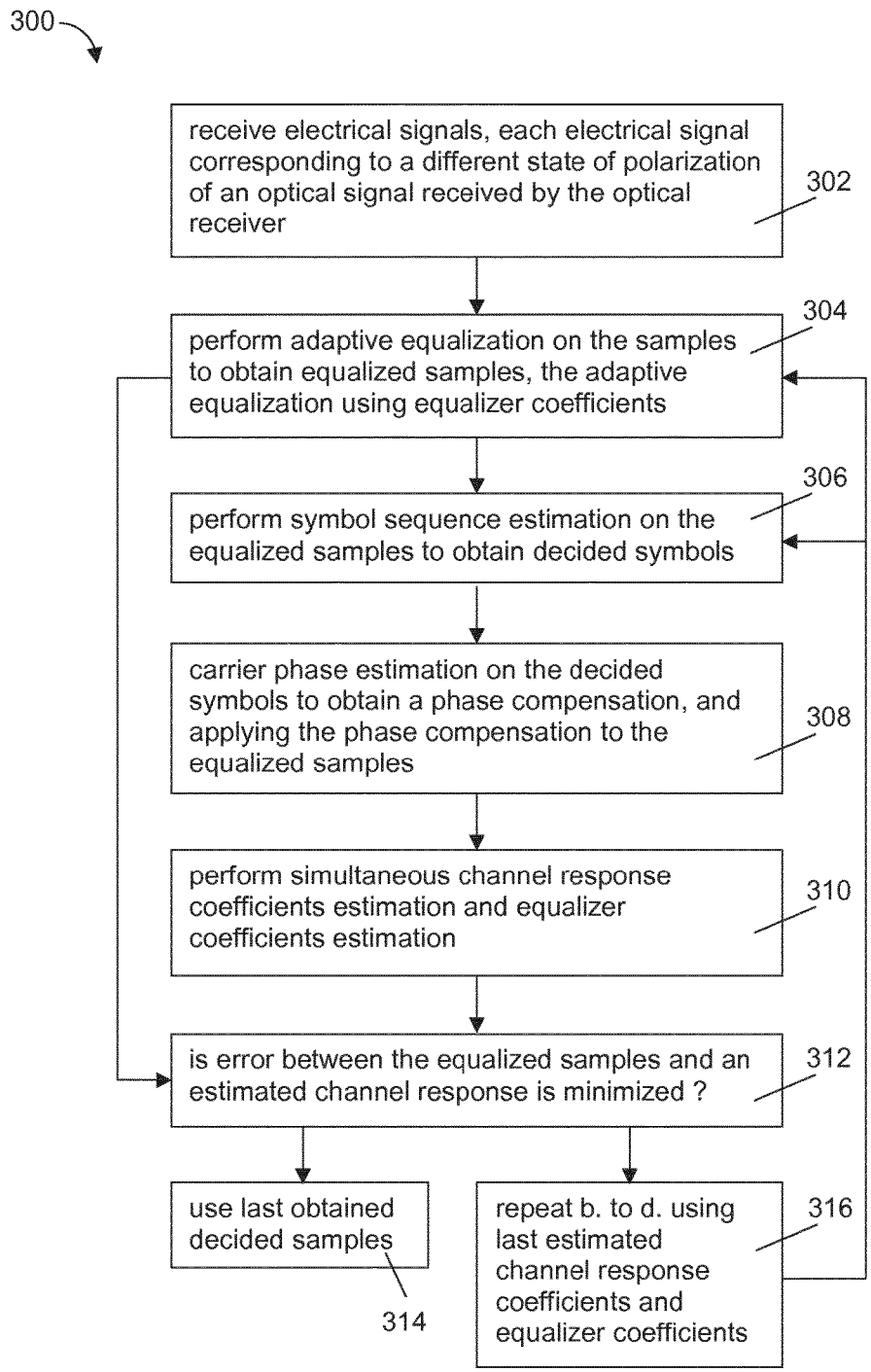
FIG. 13 shows the steps of a method of digital signal processing according to a sixteenth embodiment of the invention.

Referring to FIG. 13, a sixteenth embodiment of the invention provides a method 300 for digital signal processing of an optical communications signal in a coherent optical receiver.

The method comprises the steps of:
a. receiving electrical signals 302, each electrical signal corresponding to a different state of polarization of an optical signal received by the optical receiver;
b. performing adaptive equalization on the samples to obtain equalized samples 304, the adaptive equalization using equalizer coefficients;
c. performing symbol sequence estimation on the equalized samples to obtain decided symbols 306;
d. performing carrier phase estimation on the decided symbols to obtain a phase compensation, and applying the phase compensation to the equalized samples 308; and
e. performing simultaneous channel response coefficients estimation and equalizer coefficients estimation 310.

Step e. is repeated and steps b. to d. are performed iteratively using channel response coefficients and equalizer coefficients resulting from step e. until an error, $e_k$, between the equalized samples after phase compensation and estimated channel samples is minimized 312, 314, 316.

In a seventeenth embodiment, the method is for digital signal processing of an optical communications signal having a time-frequency packing, TFP, modulation format.

Figure 14:
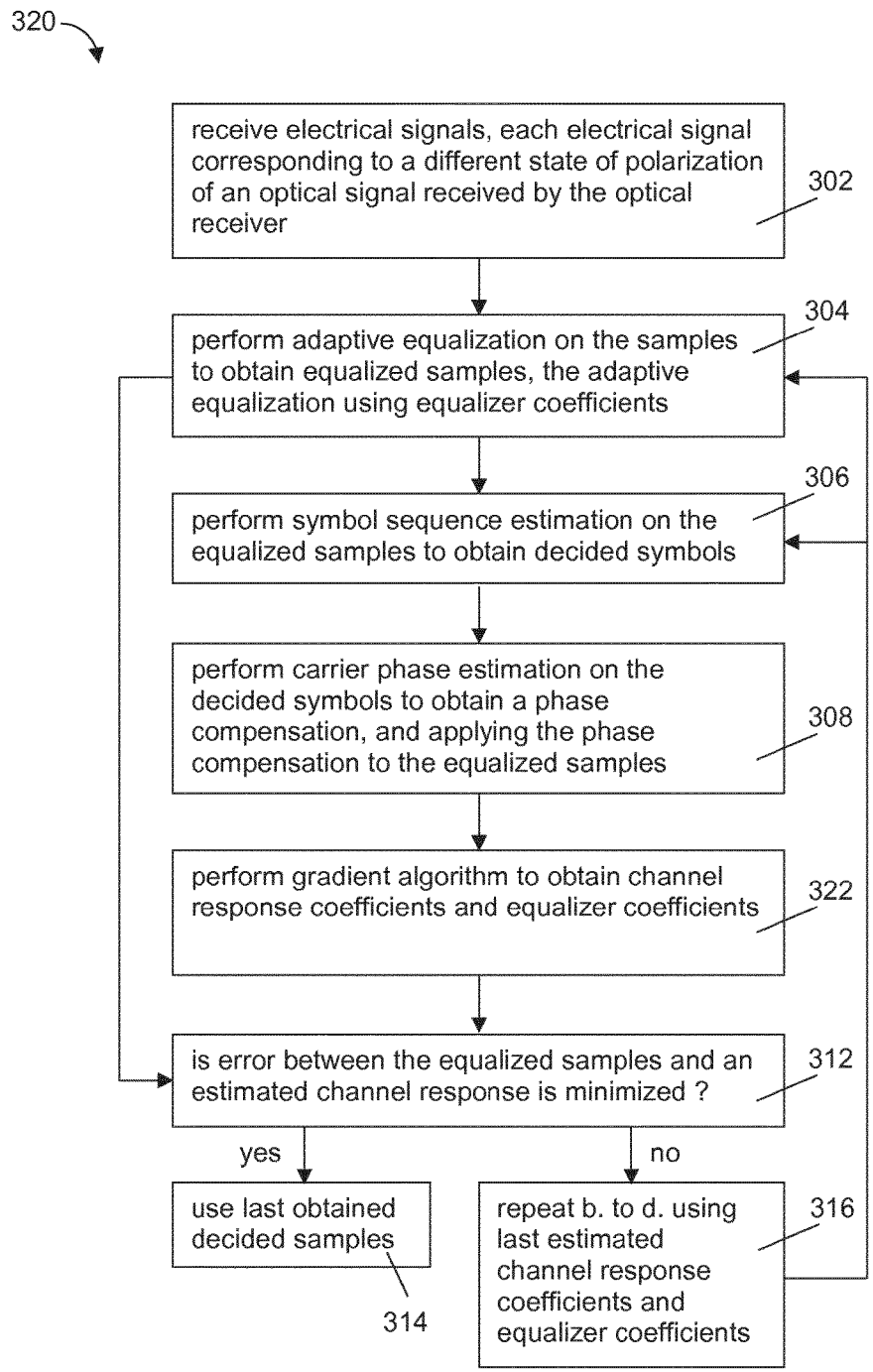
FIG. 14 shows the steps of a method of digital signal processing according to an eighteenth embodiment of the invention.

Referring to FIG. 14, an eighteenth embodiment of the invention provides a method 320 for digital signal processing of an optical communications signal in a coherent optical receiver.

In this embodiment, step e. comprises performing a gradient algorithm to obtain channel response coefficients and equalizer coefficients 322. The gradient algorithm consists of a first relationship for estimating the equalizer coefficients and a second relationship for estimating the channel response coefficients.

During each iteration, step b. is performed using the equalizer coefficients most recently estimated in step e. and step d. is performed using the channel response coefficients most recently estimated in step e.

In a nineteenth embodiment, the gradient algorithm performed in step e. is an iterative data-aided stochastic-gradient algorithm arranged to minimise the error, $e_k$.

In a twentieth embodiment, the gradient algorithm performed in step e. consists of a first relationship and a second relationship. The first relationship is arranged to estimate an equalizer coefficient, $C^{(k+1)}$, by subtracting a first update value from a preceding equalizer coefficient, $C^{(k)}$. The first update value is proportional to the error, $e_k$. The second relationship is arranged to estimate a channel response coefficient, $h^{(k+1)}$ by adding a second update value to a preceding channel response coefficient, $h^{(k)}$. The second update value is proportional to the error, $e_k$.

In a twenty-first embodiment, the gradient algorithm performed in step e. consists of a first relationship and a second relationship. The first relationship is:

$$C_i^{(k+1)} = C_i^{(k)} - \alpha_c (g_k \circ e_k) s_{k-i}^\dagger, 0 \le i \le N_c - 1,$$

where $\alpha_c$ is a first step-size gain, $g_k$ is a column vector of phase estimates for a k-th equalized signal sample, $s_k$, and $N_c$ is a number of taps of an adaptive equalizer used to perform the adaptive equalisation.

The second relationship is:

$$h_i^{(k+1)} = h_i^{(k)} + \alpha_h (e_k \circ x_{k-i}^* + e_k^* \circ x_{k+i}), 1 \le i \le L_T,$$

where $\alpha_h$ is a second step-size gain, $x_{k+1}$ is a column vector of transmitted symbols and $L_T$ is a number of signal samples used to perform the symbol sequence estimation.

In a twenty-first embodiment, the optical signal carries a sequence of transmitted symbols and pilot symbols evenly inserted in the sequence at a rate $r_p$. The carrier phase estimation of step d. is configured to exploit the pilot symbols to provide a rough initial estimate of the carrier phase.

In a twenty-second embodiment, steps b. to e. are performed separately on the samples corresponding to each state of polarisation.

In a twenty-third embodiment, the samples corresponding to each state of polarisation comprise samples corresponding to an in-phase component of the electrical signal corresponding to the said state of polarisation and samples corresponding to a quadrature component of the electrical signal corresponding to the said state of polarisation. Steps c. to e. are performed separately on the in-phase component samples and the quadrature component samples.

Figure 15:
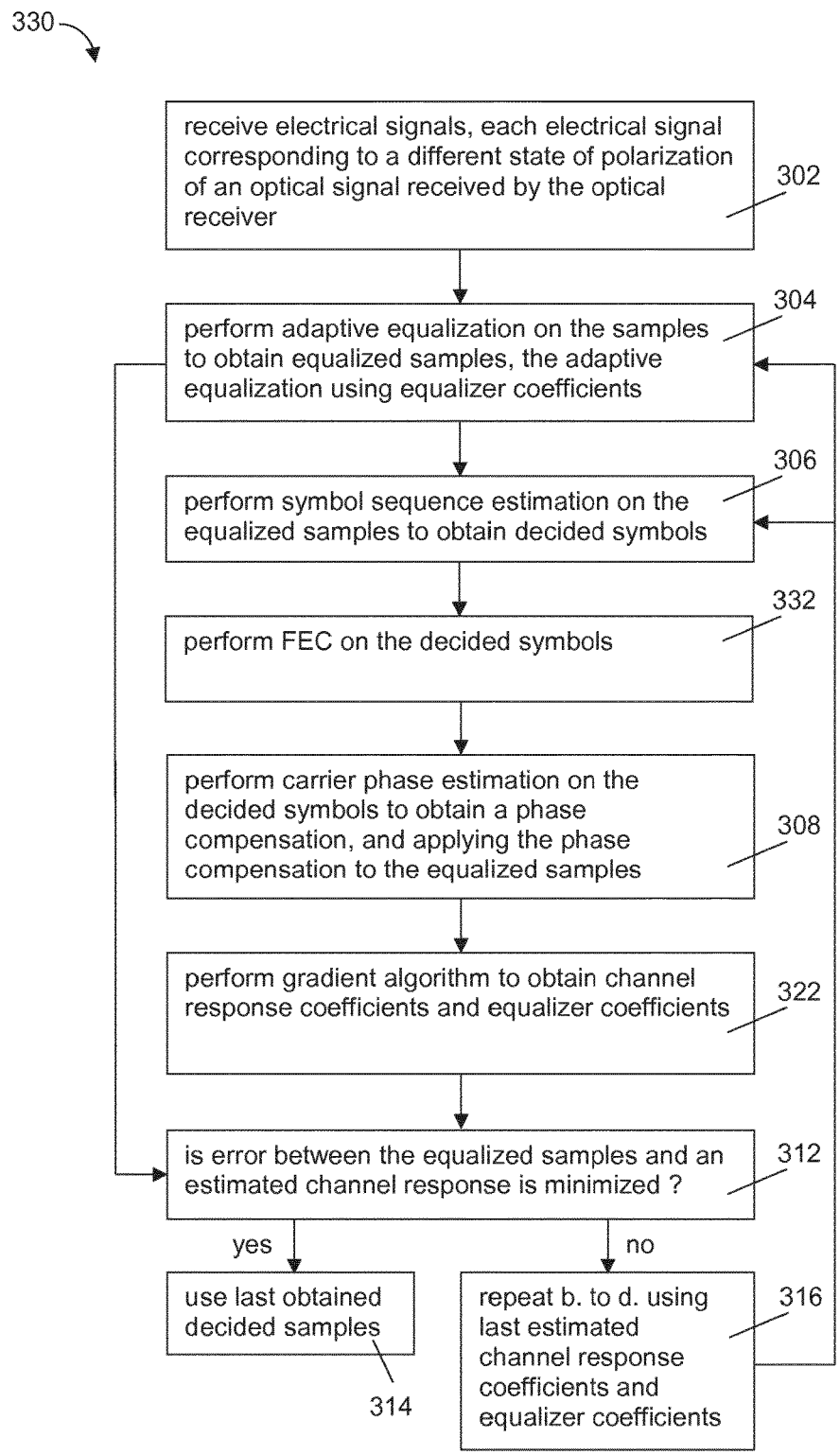
FIG. 15 shows the steps of a method of digital signal processing according to a twenty-fourth embodiment of the invention.

In a twenty-fourth embodiment, shown in FIG. 15, the method 330 further comprises performing forward error correction, FEC, 332 on the decided symbols obtained in step c. In step d. carrier phase estimation is performed on the decided symbols after forward error correction. The forward error correction may be performed using a low-density parity-check, LDPC, forward error correction code.

In an embodiment, the symbol sequence estimation is performed using a maximum a posteriori, MAP, estimation algorithm. The MAP estimation algorithm is a Bahl, Cocke, Jelinek, Raviv, BCJR, algorithm. The BCJR algorithm is a $2^{L_T}$-state BCJR algorithm. The BCJR algorithm and the LDPC code iteratively exchange information to achieve maximum a posteriori probability, MAP, detection according to the turbo principle, as described for example in J. Hagenauer "The turbo principle: Tutorial introduction and state of the art," Proc. International Symposium on Turbo Codes and Related Topics.

In a further embodiment, the symbol sequence estimation is performed using a maximum likelihood sequence estimation algorithm, MLSD. The channel response coefficients are for the Ungerboeck observation model.

In an embodiment, the carrier phase estimation is decision directed carrier phase estimation. Carrier phase estimation based on the Tikhonov parametrization algorithm and taking into account ISI may therefore be employed to cope with laser phase noise.

In an embodiment, the carrier phase estimation is non-decision directed carrier phase estimation.

Figure 16:
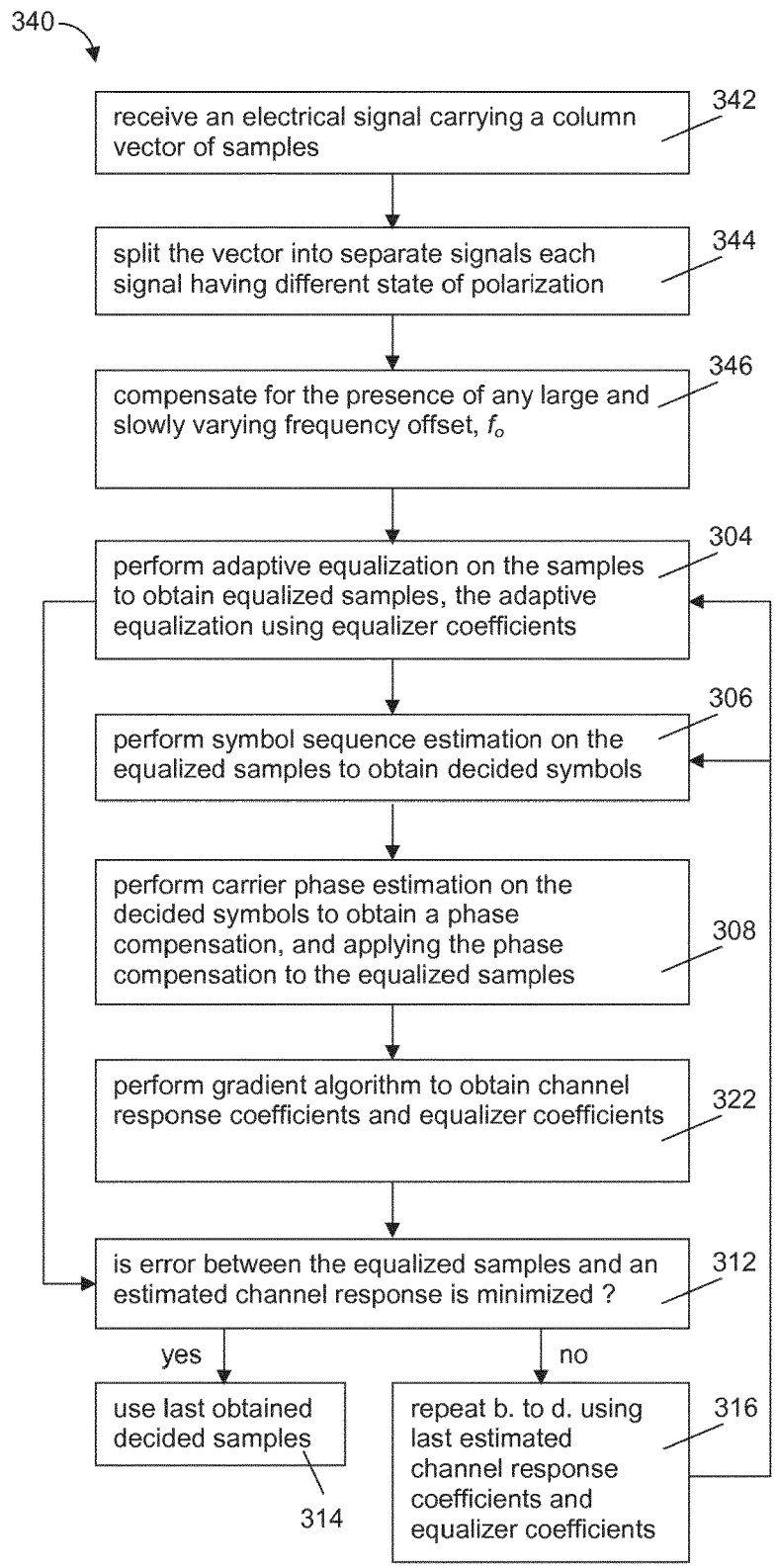
FIG. 16 shows the steps of a method of digital signal processing according to a twenty-fifth embodiment of the invention.

In a twenty-fifth embodiment, shown in FIG. 16, the method 340 comprises receiving an electrical signal carrying a column vector of samples 342. The column vector comprises one complex sample per state of polarization. The column vector is split into separate signals, each having a different state of polarization. These signals form the signals received in step a.

The method 340 further comprises compensating 346 for the presence of any large and slowly varying frequency offset, $f_o$, between a first laser used to generate the optical signal and a second laser in the coherent optical receiver. A frequency offset estimate, $\hat{f}_o$, is obtained during a training phase on a known training sequence by employing the frequency estimation algorithm described in U. Mengali and M. Morelli "Data-Aided Frequency Estimation for Burst Digital transmission", IEEE Transactions on Communications, vol. 45, no. 1, page 23, January 1997. The method comprises updating the frequency offset estimate based on decided symbols.

A twenty-sixth embodiment provides a computer program, comprising instructions which, when executed on at least one processor, cause the at least one processor to carry out the method for digital signal processing of an optical communications signal in a coherent optical receiver, as described in any of the above embodiments.

A twenty-seventh embodiment provides a carrier containing the computer program of the previous embodiment. The carrier is one of an electronic signal, optical signal, radio signal, or computer readable storage medium.

The invention claimed is:

1. A digital signal processing unit for use in a coherent optical receiver for an optical communications network, the digital signal processing unit comprising:
   an adaptive equalizer comprising:
      a number of input ports for receiving electrical signals, each electrical signal corresponding to a different state of polarization of an optical signal received by the coherent optical receiver; and
      a number of output ports,
   wherein each of the output ports is connected to a processing branch, and
      wherein the processing branch comprises:
         at least one symbol sequence estimator; and
         a carrier phase estimator comprising an input for receiving a signal tapped from an output of the processing branch,
         wherein an output of the carrier phase estimator is connected to a phase adjuster interconnecting the respective output port of the adaptive equalizer and the at least one symbol sequence estimator; and
   a processing block connected to the output of the carrier phase estimator, the output of the processing branch, at least one output of the phase adjuster, and outputs of the adaptive equalizer.

2. The digital signal processing unit of claim 1, wherein the processing block is configured to:
   perform simultaneous channel response coefficients estimation and equalizer coefficients estimation;
   provide resulting channel response coefficients to the at least one symbol sequence estimator; and
   provide resulting equalizer coefficients to the adaptive equalizer.

3. The digital signal processing unit of claim 2, wherein:
   the processing block is further configured to perform a gradient algorithm consisting of a first relationship for estimating the equalizer coefficients and a second relationship for estimating the channel response coefficients; and the at least one symbol sequence estimator is configured to perform a symbol sequence estimation algorithm using the channel response coefficients.

4. The digital signal processing unit of claim 3, wherein the gradient algorithm is an iterative data-aided stochastic-gradient algorithm arranged to minimize an error ($e_k$) between a selected equalized signal sample output from the adaptive equalizer and an estimated channel symbol.

5. The digital signal processing unit of claim 4,
wherein the first relationship is arranged to estimate an equalizer coefficient $C^{(k+1)}$ by subtracting a first update value from a preceding equalizer coefficient $C^{(k)}$, the first update value being proportional to the error $e_k$, and
wherein the second relationship is arranged to estimate a channel response coefficient $h^{(k+1)}$ by adding a second update value to a preceding channel response coefficient $h^{(k)}$, the second update value being proportional to the error $e_k$.

6. The digital signal processing unit of claim 1,
wherein the first relationship is:

$$C_i^{(k+1)} = C_i^{(k)} - a_c(g_k \circ e_k)s_{k-i}^\dagger, 0 \leq i \leq N_c - 1,$$

where $a_c$ is a first step-size gain, $g_k$ is a column vector of phase estimates for a k-th equalized signal sample (sk), and $N_c$ is a number of taps of the adaptive equalizer; and
wherein the second relationship is:

$$h_i^{(k+1)} = h_i^{(k)} + a_h(e_k \circ x_{k-i}^* + e_k^* \circ x_{k+i}), 1 \leq i \leq L_T,$$

where $a_h$ is a second step-size gain, $x_{k+1}$ is a column vector of transmitted symbols, and $L_T$ is a number of signal samples used by the at least one symbol sequence estimator.

7. The digital signal processing unit of claim 1, wherein each of the output ports of the adaptive equalizer is connected to a separate processing branch wherein each separate processing branch comprises:
the at least one symbol sequence estimator;
the carrier phase estimator; and
the phase adjuster interconnecting respective output port of the adaptive equalizer and the at least one symbol sequence estimator, and
wherein the processing block is connected to an output of each carrier phase estimator, outputs of processing branches, at least one output of outputs of the phase adjuster, and outputs of the adaptive equalizer.

8. The digital signal processing unit of claim 7,
wherein each separate processing branch comprises two symbol sequence estimators arranged in parallel, wherein one of the two symbol sequence estimators receives an in-phase component and the other of the two symbol sequence estimators receives a quadrature component of a signal output from the adaptive equalizer; and
wherein the output of the carrier phase estimator of each branch is connected to the phase adjuster interconnecting the respective output port of the adaptive equalizer and the two symbol sequence estimators.

9. The digital signal processing unit of claim 7,
wherein each separate processing branch further comprises a respective forward error correcting (FEC) decoder connected to an output of each symbol sequence estimator of the two symbol sequence estimators, and wherein inputs of the carrier phase estimator are tapped from an output of the respective FEC decoder.

10. The digital signal processing unit of claim 1, wherein the at least one symbol sequence estimator is one of a maximum a posteriori (MAP) detector and a maximum likelihood sequence detector.

11. The digital signal processing unit of claim 10, wherein the MAP detector is a Bahl, Cocke, Jelinek, Raviv (BCJR) detector.

12. The digital signal processing unit of claim 1,
wherein the carrier phase estimator is a decision directed carrier phase estimation unit, and
wherein the phase adjuster is a complex multiplier.

13. A coherent optical receiver for use in an optical communications network, the coherent optical receiver comprising:
an optical input arranged to receive an optical signal;
a splitter arranged to split the received optical signal into two orthogonal states of polarization;
a laser arranged to operate as a local oscillator to generate a second optical signal;
two 2×2 90° optical hybrids arranged to combine optical fields of the two orthogonal states of polarization received from the splitter with optical field of the second optical signal; and
four pairs of balanced photodetectors, a first two pairs of the balanced photodetectors connected to a first optical hybrid and a second two pairs of the balanced photodetectors connected to a second optical hybrid,
the four pairs of balanced photodetectors comprising four outputs arranged to output electrical signals representing in-phase and quadrature components of the two orthogonal states of polarization of the received optical signal, wherein the four outputs are connected to four analog-to-digital converters and outputs of the four analog-to-digital converters are connected to a digital signal processing unit,
wherein the digital signal processing unit comprising:
A an adaptive equalizer comprising:
a number of input ports for receiving the electrical signals, each electrical signal corresponding to a different state of polarization of the optical signal received by the coherent optical receiver; and
a number of output ports,
wherein each of the output ports is connected to a processing branch, and wherein the processing branch comprises:
at least one symbol sequence estimator; and
a carrier phase estimator comprising an input for receiving a signal tapped from an output of the processing branch,
wherein an output of the carrier phase estimator is connected to a phase adjuster interconnecting respective output port of the adaptive equalizer and the at least one symbol sequence estimator; and
a processing block connected to the output of the carrier phase estimator, the output of the processing branch, at least one output of the phase adjuster, and outputs of the adaptive equalizer.

14. A method for digital signal processing of an optical communications signal in a coherent optical receiver, the method comprising:
a) receiving electrical signals, each electrical signal corresponding to a different state of polarization of an optical signal received by the coherent optical receiver;

b) performing adaptive equalization on samples to obtain equalized samples, the adaptive equalization being performed using equalizer coefficients;

c) performing symbol sequence estimation on the equalized samples to obtain decided symbols;

d) performing carrier phase estimation on the decided symbols to obtain a phase compensation and applying the phase compensation to the equalized samples; and e) performing simultaneous channel response coefficients estimation and equalizer coefficients estimation, wherein step e) is repeated and steps b) to d) are performed iteratively using channel response coefficients and the equalizer coefficients resulting from step e) until an error between the equalized samples after the phase compensation and estimated channel samples is minimized.

15. The method of claim 14, wherein the optical communications signal has a time-frequency packing modulation format.

16. The method of claim 14,
wherein step e) further comprises performing a gradient algorithm consisting of a first relationship for estimating the equalizer coefficients and a second relationship for estimating the channel response coefficients and wherein, during each iteration:
step b) is performed using the equalizer coefficients most recently estimated in step e); and
step d) is performed using the channel response coefficients most recently estimated in step e).

17. The method of claim 16, wherein the gradient algorithm is an iterative data-aided stochastic-gradient algorithm arranged to minimize the error ($e_k$) between the equalized samples after the phase compensation and the estimated channel samples.

18. The method of claim 1,
wherein the first relationship is arranged to estimate an equalizer coefficient $C^{(k+1)}$ by subtracting a first update value from a preceding equalizer coefficient $C^{(k)}$, the first update value being proportional to the error $e_k$, and
wherein the second relationship is arranged to estimate a channel response coefficient $h^{(k+1)}$ by adding a second update value to a preceding channel response coefficient $h^{(k)}$, the second update value being proportional to the error $e_k$.

19. The method of claim 1,
wherein the first relationship is:

$$C_i^{(k+1)} = C_i^{(k)} - a_c(g_k \circ e_k)s_{k-i}^\dagger, 0 \leq i \leq N_c - 1,$$

where $a_c$ is a first step-size gain, $g_k$ is a column vector of phase estimates for a k-th equalized signal sample (sk), and $N_c$ is a number of taps used to perform the adaptive equalization, and wherein the second relationship is:

$$h_i^{(k+1)} = h_i^{(k)} + a_h(e_k \circ x_{k-i}^* + e_k^* \circ x_{k+i}), 1 \leq i \leq L_T,$$

where $a_h$ is a second step-size gain, $x_{k+i}$ is a column vector of transmitted symbols, and $L_T$ is a number of signal samples of the symbol sequence estimation.

20. A non-transitory computer readable medium storing a computer program product for digital signal processing of an optical communications signal in a coherent optical receiver, the computer program product comprising software instructions which, when executed by processing circuitry of a device, causes the device to:

a) receive electrical signals, each electrical signal corresponding to a different state of polarization of an optical signal received by the coherent optical receiver;

b) perform adaptive equalization on samples to obtain equalized samples, the adaptive equalization being performed using equalizer coefficients;

c) perform symbol sequence estimation on the equalized samples to obtain decided symbols;

d) perform carrier phase estimation on the decided symbols to obtain a phase compensation and applying the phase compensation to the equalized samples; and e) perform simultaneous channel response coefficients estimation and equalizer coefficients estimation, repeat step e) and iteratively perform steps b) to d) using channel response coefficients and the equalizer coefficients resulting from step e) until an error between the equalized samples after the phase compensation and estimated channel samples is minimized.

* * * * *